United States Patent
Kuwabara

(10) Patent No.: US 8,068,518 B2
(45) Date of Patent: Nov. 29, 2011

(54) METHOD AND DEVICE FOR VIRTUAL CONCATENATION TRANSMISSION

(75) Inventor: Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1526 days.

(21) Appl. No.: 10/830,579

(22) Filed: Apr. 23, 2004

(65) Prior Publication Data

US 2004/0196847 A1    Oct. 7, 2004

Related U.S. Application Data

(63) Continuation of application No. PCT/JP01/09917, filed on Nov. 13, 2001.

(51) Int. Cl.
*H04J 3/02* (2006.01)

(52) U.S. Cl. ......... 370/539; 370/503; 370/516; 370/535

(58) Field of Classification Search ........................ None
See application file for complete search history.

(56) References Cited

U.S. PATENT DOCUMENTS

| | | | | |
|---|---|---|---|---|
| 6,842,787 B2 * | 1/2005 | Stadler et al. | ................. | 709/231 |
| 6,917,630 B1 * | 7/2005 | Russell et al. | ................. | 370/532 |
| 6,952,396 B1 * | 10/2005 | Cottreau et al. | ............... | 370/222 |
| 6,987,766 B2 * | 1/2006 | Mesh et al. | ..................... | 370/393 |
| 6,999,470 B2 * | 2/2006 | Murton et al. | ................. | 370/466 |
| 7,085,293 B2 * | 8/2006 | Raghavan et al. | ............ | 370/506 |
| 7,177,314 B2 * | 2/2007 | Wu et al. | ................... | 370/395.51 |
| 7,257,117 B2 * | 8/2007 | Roberts et al. | ................. | 370/392 |
| 7,277,459 B1 * | 10/2007 | Abbas | ........................... | 370/539 |

FOREIGN PATENT DOCUMENTS

| | | |
|---|---|---|
| JP | 2000-022652 | 1/2000 |
| JP | 2000-197167 | 7/2000 |
| JP | 2000-278235 | 10/2000 |

* cited by examiner

*Primary Examiner* — Michael J Moore, Jr.

(74) *Attorney, Agent, or Firm* — Katten Muchin Rosenman LLP

(57) ABSTRACT

In a method and a device for virtual concatenation transmission which multiplex traffics of low-speed frames into a high-speed frame based on a virtual concatenation, a virtual concatenation with an excellent transmission efficiency is provided. Specifically, in order to provide the transmission method and the device which do not waste channels, require little labor of operators, do not cause an instantaneous interruption, and require no memory capacity, a plurality of low-speed frames are multiplexed into arbitrary positions within a high-speed frame to compose a virtual concatenation, and are transmitted together with virtual concatenation information indicating a concatenation state of positions of the low-speed frames, with a phase relationship being maintained.

34 Claims, 20 Drawing Sheets

FIG.1A

| CH1 | CH2 | CH3 | CH4 | CH5 | CH6 | CH7 | CH8 | CH9 | CH10 | CH11 | CH12 |
|---|---|---|---|---|---|---|---|---|---|---|---|
| CH13 | CH14 | CH15 | CH16 | CH17 | CH18 | CH19 | CH20 | CH21 | CH22 | CH23 | CH24 |
| CH25 | CH26 | CH27 | CH28 | CH29 | CH30 | CH31 | CH32 | CH33 | CH34 | CH35 | CH36 |
| CH37 | CH38 | CH39 | CH40 | CH41 | CH42 | CH43 | CH44 | CH45 | CH46 | CH47 | CH48 |
| CH49 | CH50 | CH51 | CH52 | CH53 | CH54 | CH55 | CH56 | CH57 | CH58 | CH59 | CH60 |
| CH61 | CH62 | CH63 | CH64 | CH65 | CH66 | CH67 | CH68 | CH69 | CH70 | CH71 | CH72 |
| CH73 | CH74 | CH75 | CH76 | CH77 | CH78 | CH79 | CH80 | CH81 | CH82 | CH83 | CH84 |
| CH85 | CH86 | CH87 | CH88 | CH89 | CH90 | CH91 | CH92 | CH93 | CH94 | CH95 | CH96 |
| CH97 | CH98 | CH99 | CH100 | CH101 | CH102 | CH103 | CH104 | CH105 | CH106 | CH107 | CH108 |
| CH109 | CH110 | CH111 | CH112 | CH113 | CH114 | CH115 | CH116 | CH117 | CH118 | CH119 | CH120 |
| CH121 | CH122 | CH123 | CH124 | CH125 | CH126 | CH127 | CH128 | CH129 | CH130 | CH131 | CH132 |
| CH133 | CH134 | CH135 | CH136 | CH137 | CH138 | CH139 | CH140 | CH141 | CH142 | CH143 | CH144 |
| CH145 | CH146 | CH147 | CH148 | CH149 | CH150 | CH151 | CH152 | CH153 | CH154 | CH155 | CH156 |
| CH157 | CH158 | CH159 | CH160 | CH161 | CH162 | CH163 | CH164 | CH165 | CH166 | CH167 | CH168 |
| CH169 | CH170 | CH171 | CH172 | CH173 | CH174 | CH175 | CH176 | CH177 | CH178 | CH179 | CH180 |
| CH181 | CH182 | CH183 | CH184 | CH185 | CH186 | CH187 | CH188 | CH189 | CH190 | CH191 | CH192 |

FIG.1B

| CH1 | CH2 | CH3 | CH4 | CH5 | CH6 | CH7 | CH8 | CH9 | CH10 | CH11 | CH12 |
|---|---|---|---|---|---|---|---|---|---|---|---|
| CH13 | CH14 | CH15 | CH16 | CH17 | CH18 | CH19 | CH20 | CH21 | CH22 | CH23 | CH24 |
| CH25 | CH26 | CH27 | CH28 | CH29 | CH30 | CH31 | CH32 | CH33 | CH34 | CH35 | CH36 |
| CH37 | CH38 | CH39 | CH40 | CH41 | CH42 | CH43 | CH44 | CH45 | CH46 | CH47 | CH48 |
| CH49 | CH50 | CH51 | CH52 | CH53 | CH54 | CH55 | CH56 | CH57 | CH58 | CH59 | CH60 |
| CH61 | CH62 | CH63 | CH64 | CH65 | CH66 | CH67 | CH68 | CH69 | CH70 | CH71 | CH72 |
| CH73 | CH74 | CH75 | CH76 | CH77 | CH78 | CH79 | CH80 | CH81 | CH82 | CH83 | CH84 |
| CH85 | CH86 | CH87 | CH88 | CH89 | CH90 | CH91 | CH92 | CH93 | CH94 | CH95 | CH96 |
| CH97 | CH98 | CH99 | CH100 | CH101 | CH102 | CH103 | CH104 | CH105 | CH106 | CH107 | CH108 |
| CH109 | CH110 | CH111 | CH112 | CH113 | CH114 | CH115 | CH116 | CH117 | CH118 | CH119 | CH120 |
| CH121 | CH122 | CH123 | CH124 | CH125 | CH126 | CH127 | CH128 | CH129 | CH130 | CH131 | CH132 |
| CH133 | CH134 | CH135 | CH136 | CH137 | CH138 | CH139 | CH140 | CH141 | CH142 | CH143 | CH144 |
| CH145 | CH146 | CH147 | CH148 | CH149 | CH150 | CH151 | CH152 | CH153 | CH154 | CH155 | CH156 |
| CH157 | CH158 | CH159 | CH160 | CH161 | CH162 | CH163 | CH164 | CH165 | CH166 | CH167 | CH168 |
| CH169 | CH170 | CH171 | CH172 | CH173 | CH174 | CH175 | CH176 | CH177 | CH178 | CH179 | CH180 |
| CH181 | CH182 | CH183 | CH184 | CH185 | CH186 | CH187 | CH188 | CH189 | CH190 | CH191 | CH192 |

FIG.1C

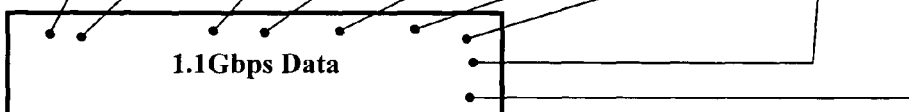

1.1Gbps Data

FIG.5

| | CH1 | CH2 | CH3 | CH4 | CH5 | CH6 | CH7 | CH8 | CH9 | CH10 | CH11 | CH12 |
|---|---|---|---|---|---|---|---|---|---|---|---|---|
| H1 | | | | | | | | | | | | |
| H2 | | | | | | | | | | | | |
| | CH13 | CH14 | CH15 | CH16 | CH17 | CH18 | CH19 | CH20 | CH21 | CH22 | CH23 | CH24 |
| H1 | | | 93h | | | | | | | | | |
| H2 | | | CEh | | | | | | | | | |
| | CH25 | CH26 | CH27 | CH28 | CH29 | CH30 | CH31 | CH32 | CH33 | CH34 | CH35 | CH36 |
| H1 | | | | | | | 93h | 93h | 93h | | | |
| H2 | | | | | | | F1h | FFh | FFh | | | |
| | CH37 | CH38 | CH39 | CH40 | CH41 | CH42 | CH43 | CH44 | CH45 | CH46 | CH47 | CH48 |
| H1 | | | | | | | | | | | 93h | |
| H2 | | | | | | | | | | | B4h | |
| | CH49 | CH50 | CH51 | CH52 | CH53 | CH54 | CH55 | CH56 | CH57 | CH58 | CH59 | CH60 |
| H1 | | 60h | | | | | | | | | | |
| H2 | | 00h | | | | | | | | | | |
| | CH61 | CH62 | CH63 | CH64 | CH65 | CH66 | CH67 | CH68 | CH69 | CH70 | CH71 | CH72 |
| H1 | | | | | | | | | | | | |
| H2 | | | | | | | | | | | | |
| | CH73 | CH74 | CH75 | CH76 | CH77 | CH78 | CH79 | CH80 | CH81 | CH82 | CH83 | CH84 |
| H1 | | | | 93h | | | | | | | | |
| H2 | | | | E1h | | | | | | | | |
| | CH85 | CH86 | CH87 | CH88 | CH89 | CH90 | CH91 | CH92 | CH93 | CH94 | CH95 | CH96 |
| H1 | | | | | | | | | | | | |
| H2 | | | | | | | | | | | | |
| | CH97 | CH98 | CH99 | CH100 | CH101 | CH102 | CH103 | CH104 | CH105 | CH106 | CH107 | CH108 |
| H1 | | | | | | | | | | | | |
| H2 | | | | | | | | | | | | |
| | CH109 | CH110 | CH111 | CH112 | CH113 | CH114 | CH115 | CH116 | CH117 | CH118 | CH119 | CH120 |
| H1 | 93h | 93h | 93h | 93h | 93h | 93h | 93h | 93h | 93h | 93h | 93h | 93h |
| H2 | 5Dh | FFh | FFh | FFh | FFh | FFh | FFh | FFh | FFh | FFh | FFh | FFh |
| | CH121 | CH122 | CH123 | CH124 | CH125 | CH126 | CH127 | CH128 | CH129 | CH130 | CH131 | CH132 |
| H1 | | | | | | | | | | | | |
| H2 | | | | | | | | | | | | |
| | CH133 | CH134 | CH135 | CH136 | CH137 | CH138 | CH139 | CH140 | CH141 | CH142 | CH143 | CH144 |
| H1 | | | | | | | | | | | 93h | |
| H2 | | | | | | | | | | | 4Fh | |
| | CH145 | CH146 | CH147 | CH148 | CH149 | CH150 | CH151 | CH152 | CH153 | CH154 | CH155 | CH156 |
| H1 | | | | | | | | | | | | |
| H2 | | | | | | | | | | | | |
| | CH157 | CH158 | CH159 | CH160 | CH161 | CH162 | CH163 | CH164 | CH165 | CH166 | CH167 | CH168 |
| H1 | | | | | | | 93h | | | | | |
| H2 | | | | | | | D1h | | | | | |
| | CH169 | CH170 | CH171 | CH172 | CH173 | CH174 | CH175 | CH176 | CH177 | CH178 | CH179 | CH180 |
| H1 | | | | | | | | 93h | | | | |
| H2 | | | | | | | | 93h | | | | |
| | CH181 | CH182 | CH183 | CH184 | CH185 | CH186 | CH187 | CH188 | CH189 | CH190 | CH191 | CH192 |
| H1 | | | | | | | | | | | | |
| H2 | | | | | | | | | | | | |

FIG.7A

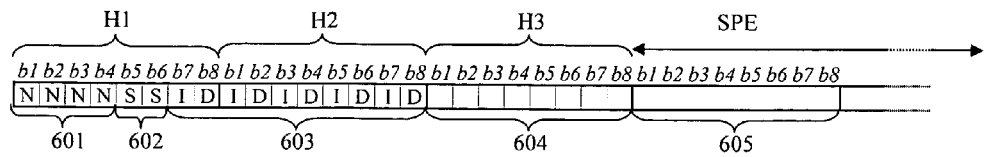

FIG.7B

| ITEM | RECEPTION STATE | NNNN | SS | IDIDIDIDID + DETECTING CONDITION |
|---|---|---|---|---|
| (11) | ACTIVE POINTER | NORMAL NDF | "--" | NORMAL RANGE OF OFFSET VALUE (0 - 782) |
| (12) | NDF ENABLE | NDF ENABLE | "--" | NORMAL RANGE OF OFFSET VALUE (0 - 782) |
| (13) | INCREMENT INDICATION | NORMAL NDF | "--" | COMPARED WITH ACT-PTR, WHEN FOLLOWING TWO CONDITIONS ARE SATISFIED ①EQUAL TO OR MORE THAN 3 BITS OF I BITS ARE INVERTED ②LESS THAN 3 BITS OF D BITS ARE INVERTED, WHERE (12),(13),(14) DO NOT OCCUR DURING PREVIOUS 3 FRAMES |
| (14) | DECREMENT INDICATION | NORMAL NDF | "--" | COMPARED WITH ACT-PTR, WHEN FOLLOWING TWO CONDITIONS ARE SATISFIED ①EQUAL TO OR MORE THAN 3 BITS OF D BITS ARE INVERTED ②LESS THAN 3 BITS OF I BITS ARE INVERTED, WHERE (12),(13),(14) DO NOT OCCUR DURING PREVIOUS 3 FRAMES |
| (15) | ALARM INDICATING SIGNAL (AIS) | "1111" | "11" | "1111111111" |
| (16) | CONCATENATION INDICATION | NDF ENABLE | "--" | "1111111111" |
| (17) | VIRTUAL CONCATENATION INDICATION | NDF ENABLE | "--" | BIT INVERSION OF PREVIOUS CHANNEL NO. [1023- (1024 - N)] |
| (18) | INVALID POINTER | - | "--" | OUT OF NORMAL RANGE[783-(1023-N)] (INCLUDING INCREMENT/DECREMENT INDICATION) |
| (18) | INVALID POINTER | NORMAL NDF | "--" | VALUE DIFFERENT FROM ACTIVE POINTER VALUE (EXCLUDING INCREMENT/DECREMENT INDICATION) |
| (18) | INVALID POINTER | "1111" | "11" | "1111111111" (= AIS INDICATION) |
| | INVALID POINTER | /= ALARM INDICATING SIGNAL-ind (EXCLUDING NDF-ENABLE INDICATION) | | |
| | INVALID POINTER | /= CONCATENATION INDICATION (INCLUDING AIS INDICATION) | | |

FIG.7C

| ITEM | NNNN | SS | IDIDIDIDID | MEANING | RECEPTION STATE | ITEM |
|---|---|---|---|---|---|---|
| (19) | NDF ENABLE | "--" | "1111111111" | INDICATING NORMAL CONCATENATION | CONCATENATION INDICATION | (16) |
| (20) | NDF ENABLE | "--" | "1111111110" | INDICATING PREVOUSLY CONCATENATED CH IS CH1 | VIRTUAL CONCATENATION INDICATION | (17) |
| (20) | NDF ENABLE | "--" | "1111111101" | INDICATING PREVOUSLY CONCATENATED CH IS CH2 | VIRTUAL CONCATENATION INDICATION | (17) |
| (20) | NDF ENABLE | "--" | "1111111100" | INDICATING PREVOUSLY CONCATENATED CH IS CH3 | VIRTUAL CONCATENATION INDICATION | (17) |
| (20) | NDF ENABLE | "--" | (1024 - N) [DEC] | INDICATING PREVOUSLY CONCATENATED CH IS CHN | VIRTUAL CONCATENATION INDICATION | (17) |
| (21) | - | "--" | (1023 - N) [DEC] : "1100001111" | INDICATING POINTER VALUE IS INVALID | INVALID POINTER (n) | (18) |
| (22) | NDF ENABLE | "--" | "1100001110" | INDICATING OFFSET= 782 | NDF ENABLE | (12) |
| (22) | NDF ENABLE | "--" | "0000000010" | INDICATING OFFSET= 2 | NDF ENABLE | (12) |
| (22) | NDF ENABLE | "--" | "0000000001" | INDICATING OFFSET= 1 | NDF ENABLE | (12) |
| (22) | NDF ENABLE | "--" | "0000000000" | INDICATING OFFSET= 0 | NDF ENABLE | (12) |

| SETTING | | SELECTION TIMING | REMARKS |
|---|---|---|---|
| CONCATE-NATION | STS-1 | CH$k$ | |
| | STS-3c | CH$j$ ($j = \{(k-1)\backslash 3\}*3+1$ | HEAD CHANNEL OF EACH STS-3c |
| | STS-12c | CH$i$ ($i = \{(k-1)\backslash 12\}*12+1$ | HEAD CHANNEL OF EACH STS-12c |
| | STS-48c | CH$h$ ($h = \{(k-1)\backslash 48\}*48+1$ | HEAD CHANNEL OF STS-48c |
| VIRTUAL CONCATENATION | | FORWARD DIRECTION LIST RETRIEVAL RESULT | HEAD CHANNEL OF Virt. CONC |

FIG.11
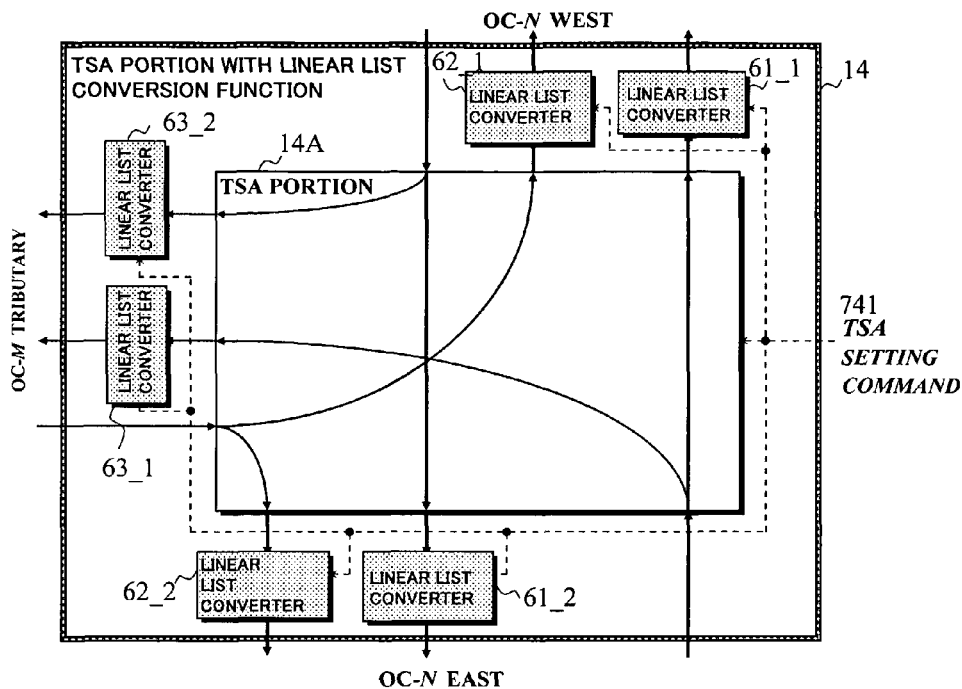
FIG.12A BEFORE TSA
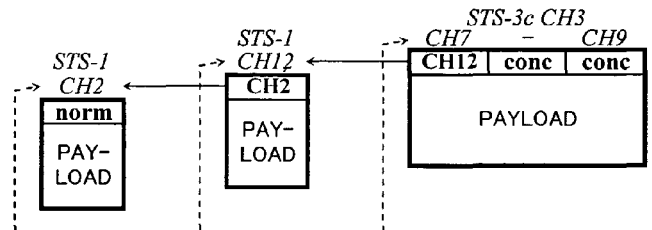
FIG.12B AFTER TSA
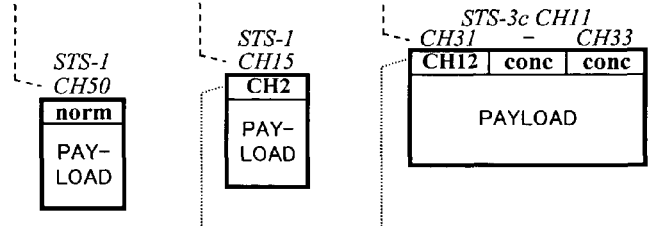
FIG.12C AFTER LINEAR LIST CONVERSION
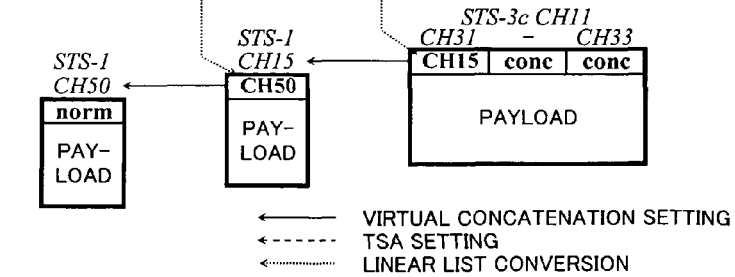
⟵——— VIRTUAL CONCATENATION SETTING
⟵------ TSA SETTING
⟵········· LINEAR LIST CONVERSION FIG.13
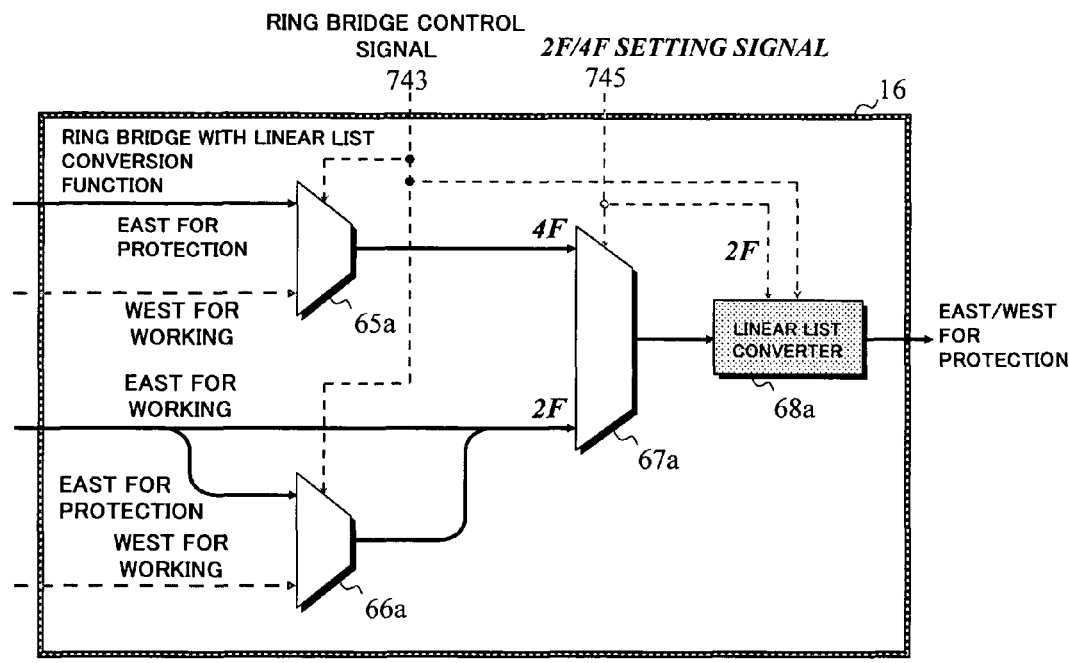
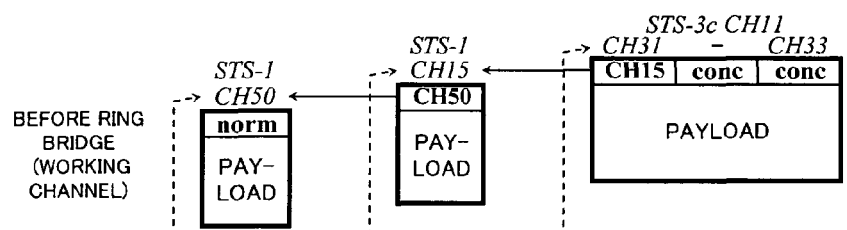
FIG.14A BEFORE RING BRIDGE (WORKING CHANNEL)
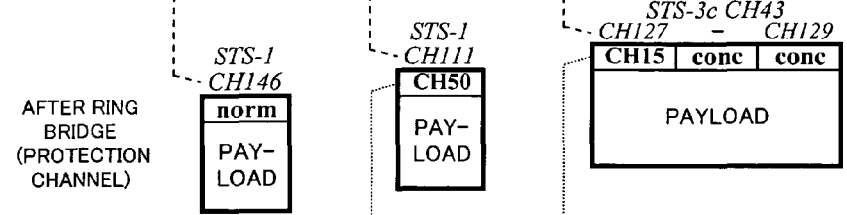
FIG.14B AFTER RING BRIDGE (PROTECTION CHANNEL)
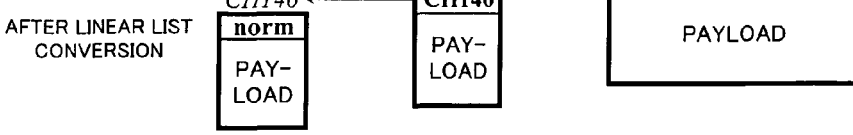
FIG.14C AFTER LINEAR LIST CONVERSION
⟵⎯⎯⎯  VIRTUAL CONCATENATION SETTING
⟵ - - - -   TSA SETTING
⟵········  LINEAR LIST CONVERSION FIG.15
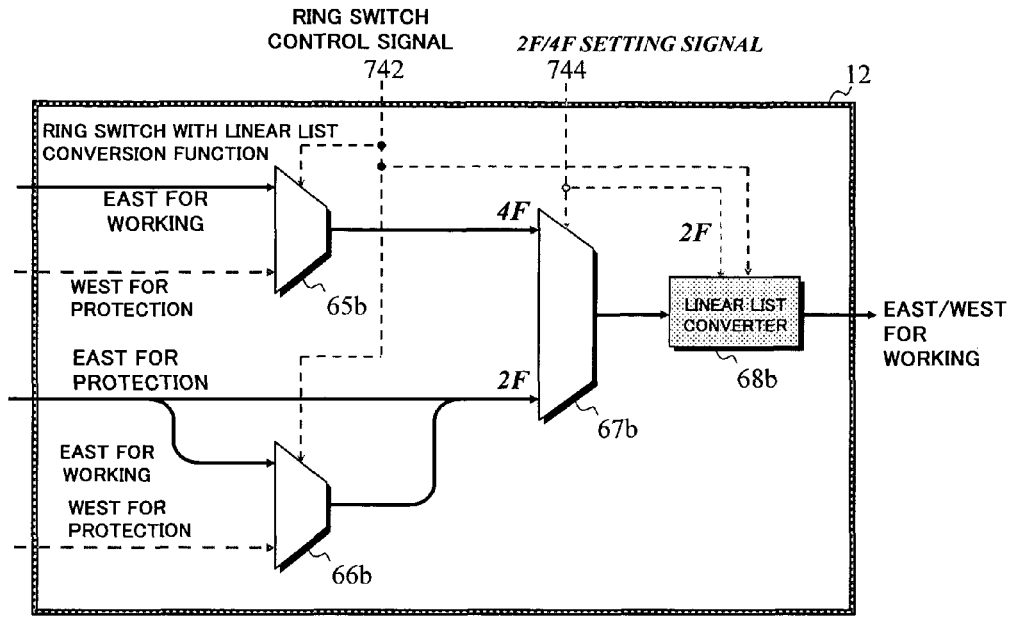
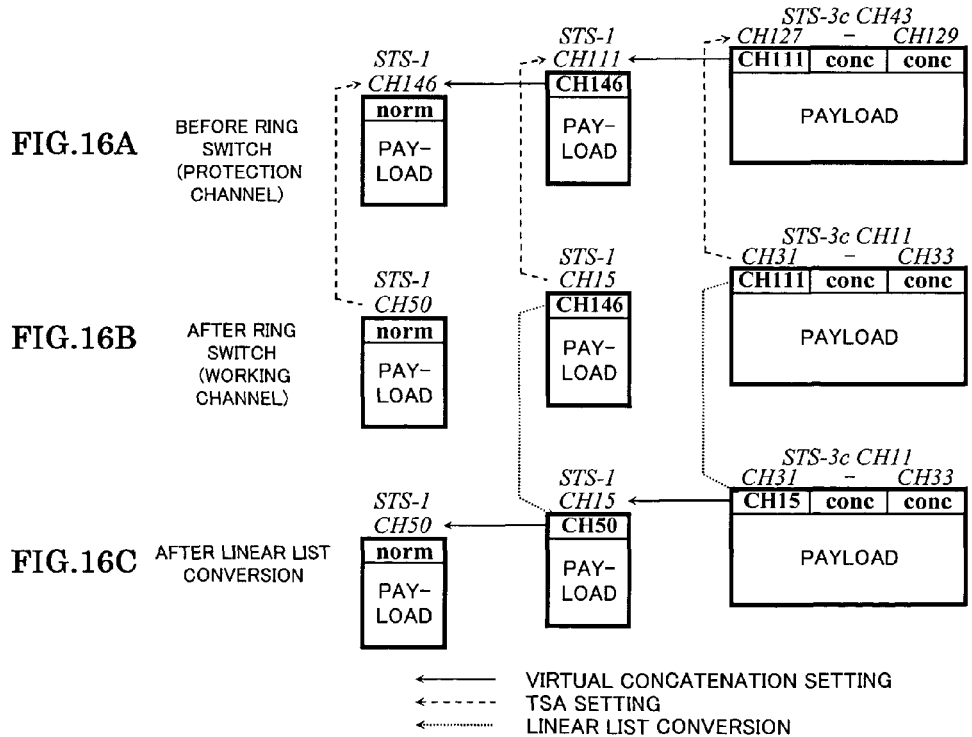
FIG.16A BEFORE RING SWITCH (PROTECTION CHANNEL)
FIG.16B AFTER RING SWITCH (WORKING CHANNEL)
FIG.16C AFTER LINEAR LIST CONVERSION
⟵ VIRTUAL CONCATENATION SETTING
⟵--- TSA SETTING
⟵······ LINEAR LIST CONVERSION

FIG.23 PRIOR ART

| PATH ALARM | REFERENCE OH BYTE | EXPLANATION | |
|---|---|---|---|
| | | MEANING | |
| LOSS OF POINTER (LOP) | H1/H2 | WHEN POINTER VALUE OF RECEIVED H1/H2 BECOMES INVALID POINTER | |
| PATH ALARM INDICATION SIGNAL (PAIS) | H1/H2 | WHEN ALL OF RECEIVED H1/H2 ARE "1" | |
| STS LINE UNEQUIPPED (UNEQ) | C2 | WHEN RECEIVED C2 BYTE IS "00h" | |
| STS PAYLOAD LABEL MISMATCH (PLM) | C2 | WHEN RECEIVED C2 BYTE IS DIFFERENT FROM EXPECTED VALUE DESIGNATED BY USER | |
| STS PAYLOAD DEFECT INDICATION (PDI) | C2 | WHEN RECEIVED C2 BYTE BECOMES "E1h" – "FCh" | |
| MAJOR ALARM (B3MAJ) | B3 | WHEN LINE DETERIORATION STATE DUE TO ERROR NUMBER AFTER PARITY OPERATION OF RECEIVED B3 BYTES IS ERROR RATE >10E-3 | |
| MINOR ALARM (B3MIN) | B3 | WHEN LINE DETERIORATION STATE DUE TO ERROR NUMBER AFTER PARITY OPERATION OF RECEIVED B3 BYTES IS ERROR RATE >10E-5 | |

FIG. 25A  PRIOR ART

| CH1 | CH2 | CH3 | CH4 | CH5 | CH6 | CH7 | CH8 | CH9 | CH10 | CH11 | CH12 |
|---|---|---|---|---|---|---|---|---|---|---|---|
| CH13 | CH14 | CH15 | CH16 | CH17 | CH18 | CH19 | CH20 | CH21 | CH22 | CH23 | CH24 |
| CH25 | CH26 | CH27 | CH28 | CH29 | CH30 | CH31 | CH32 | CH33 | CH34 | CH35 | CH36 |
| CH37 | CH38 | CH39 | CH40 | CH41 | CH42 | CH43 | CH44 | CH45 | CH46 | CH47 | CH48 |
| CH49 | CH50 | CH51 | CH52 | CH53 | CH54 | CH55 | CH56 | CH57 | CH58 | CH59 | CH60 |
| CH61 | CH62 | CH63 | CH64 | CH65 | CH66 | CH67 | CH68 | CH69 | CH70 | CH71 | CH72 |
| CH73 | CH74 | CH75 | CH76 | CH77 | CH78 | CH79 | CH80 | CH81 | CH82 | CH83 | CH84 |
| CH85 | CH86 | CH87 | CH88 | CH89 | CH90 | CH91 | CH92 | CH93 | CH94 | CH95 | CH96 |
| CH97 | CH98 | CH99 | CH100 | CH101 | CH102 | CH103 | CH104 | CH105 | CH106 | CH107 | CH108 |
| CH109 | CH110 | CH111 | CH112 | CH113 | CH114 | CH115 | CH116 | CH117 | CH118 | CH119 | CH120 |
| CH121 | CH122 | CH123 | CH124 | CH125 | CH126 | CH127 | CH128 | CH129 | CH130 | CH131 | CH132 |
| CH133 | CH134 | CH135 | CH136 | CH137 | CH138 | CH139 | CH140 | CH141 | CH142 | CH143 | CH144 |
| CH145 | CH146 | CH147 | CH148 | CH149 | CH150 | CH151 | CH152 | CH153 | CH154 | CH155 | CH156 |
| CH157 | CH158 | CH159 | CH160 | CH161 | CH162 | CH163 | CH164 | CH165 | CH166 | CH167 | CH168 |
| CH169 | CH170 | CH171 | CH172 | CH173 | CH174 | CH175 | CH176 | CH177 | CH178 | CH179 | CH180 |
| CH181 | CH182 | CH183 | CH184 | CH185 | CH186 | CH187 | CH188 | CH189 | CH190 | CH191 | CH192 |

FIG. 25B  PRIOR ART

| CH1 | CH2 | CH3 | CH4 | CH5 | CH6 | CH7 | CH8 | CH9 | CH10 | CH11 | CH12 |
|---|---|---|---|---|---|---|---|---|---|---|---|
| CH13 | CH14 | CH15 | CH16 | CH17 | CH18 | CH19 | CH20 | CH21 | CH22 | CH23 | CH24 |
| CH25 | CH26 | CH27 | CH28 | CH29 | CH30 | CH31 | CH32 | CH33 | CH34 | CH35 | CH36 |
| CH37 | CH38 | CH39 | CH40 | CH41 | CH42 | CH43 | CH44 | CH45 | CH46 | CH47 | CH48 |
| CH49 | CH50 | CH51 | CH52 | CH53 | CH54 | CH55 | CH56 | CH57 | CH58 | CH59 | CH60 |
| CH61 | CH62 | CH63 | CH64 | CH65 | CH66 | CH67 | CH68 | CH69 | CH70 | CH71 | CH72 |
| CH73 | CH74 | CH75 | CH76 | CH77 | CH78 | CH79 | CH80 | CH81 | CH82 | CH83 | CH84 |
| CH85 | CH86 | CH87 | CH88 | CH89 | CH90 | CH91 | CH92 | CH93 | CH94 | CH95 | CH96 |
| CH97 | CH98 | CH99 | CH100 | CH101 | CH102 | CH103 | CH104 | CH105 | CH106 | CH107 | CH108 |
| CH109 | CH110 | CH111 | CH112 | CH113 | CH114 | CH115 | CH116 | CH117 | CH118 | CH119 | CH120 |
| CH121 | CH122 | CH123 | CH124 | CH125 | CH126 | CH127 | CH128 | CH129 | CH130 | CH131 | CH132 |
| CH133 | CH134 | CH135 | CH136 | CH137 | CH138 | CH139 | CH140 | CH141 | CH142 | CH143 | CH144 |
| CH145 | CH146 | CH147 | CH148 | CH149 | CH150 | CH151 | CH152 | CH153 | CH154 | CH155 | CH156 |
| CH157 | CH158 | *CH159* | CH160 | CH161 | CH162 | CH163 | CH164 | CH165 | CH166 | CH167 | CH168 |
| CH169 | CH170 | CH171 | CH172 | CH173 | CH174 | CH175 | CH176 | CH177 | CH178 | CH179 | CH180 |
| CH181 | CH182 | CH183 | CH184 | CH185 | CH186 | CH187 | CH188 | CH189 | CH190 | CH191 | CH192 |

FIG. 25C  PRIOR ART

| CH1 | CH2 | CH3 | CH4 | CH5 | CH6 | CH7 | CH8 | CH9 | CH10 | CH11 | CH12 |
|---|---|---|---|---|---|---|---|---|---|---|---|
| CH13 | CH14 | CH15 | CH16 | CH17 | CH18 | CH19 | CH20 | CH21 | CH22 | CH23 | CH24 |
| CH25 | CH26 | CH27 | CH28 | CH29 | CH30 | CH31 | CH32 | CH33 | CH34 | CH35 | CH36 |
| CH37 | CH38 | CH39 | CH40 | CH41 | CH42 | CH43 | CH44 | CH45 | CH46 | CH47 | CH48 |
| CH49 | CH50 | CH51 | CH52 | CH53 | CH54 | CH55 | CH56 | CH57 | CH58 | CH59 | CH60 |
| CH61 | CH62 | CH63 | CH64 | CH65 | CH66 | CH67 | CH68 | CH69 | CH70 | CH71 | CH72 |
| CH73 | CH74 | CH75 | CH76 | CH77 | CH78 | CH79 | CH80 | CH81 | CH82 | CH83 | CH84 |
| CH85 | CH86 | CH87 | CH88 | CH89 | CH90 | CH91 | CH92 | CH93 | CH94 | CH95 | CH96 |
| CH97 | CH98 | CH99 | CH100 | CH101 | CH102 | CH103 | CH104 | CH105 | CH106 | CH107 | CH108 |
| CH109 | CH110 | CH111 | CH112 | CH113 | CH114 | CH115 | CH116 | CH117 | CH118 | CH119 | CH120 |
| CH121 | CH122 | CH123 | CH124 | CH125 | CH126 | CH127 | CH128 | CH129 | CH130 | CH131 | CH132 |
| CH133 | CH134 | CH135 | CH136 | CH137 | CH138 | CH139 | CH140 | CH141 | CH142 | CH143 | CH144 |
| CH145 | CH146 | CH147 | CH148 | CH149 | CH150 | CH151 | CH152 | CH153 | CH154 | CH155 | CH156 |
| CH157 | CH158 | CH159 | CH160 | CH161 | CH162 | CH163 | CH164 | CH165 | CH166 | CH167 | CH168 |
| CH169 | CH170 | CH171 | CH172 | CH173 | CH174 | CH175 | CH176 | CH177 | CH178 | CH179 | CH180 |
| CH181 | CH182 | CH183 | CH184 | CH185 | CH186 | CH187 | CH188 | CH189 | CH190 | CH191 | CH192 |

FIG. 25D  PRIOR ART

| 1.2Gbps Data |
|---|

METHOD AND DEVICE FOR VIRTUAL CONCATENATION TRANSMISSION

CROSS REFERENCE TO RELATED APPLICATION

The present application is a continuation of and claims priority under 35 USC §120 from International PCT Application No. PCT/JP01/09917, filed on Nov. 13, 2001.

BACKGROUND OF THE INVENTION

1. Field of the Invention

The present invention relates to a method and a device for virtual concatenation transmission, and in particular to a method and a device for virtual concatenation transmission which multiplex low-speed frame traffics into a high-speed frame based on virtual concatenation.

In recent years, demands for various kinds of data communication lines have been growing in e.g. SONET/SDH optical transmission systems, as information services through the Internet or the like rapidly become widespread. In such data communication lines, it is required to treat data of various kinds/capacities as traffic. Specifically, in information services provided through the Internet in these several years, kinds of data treated are not only character information but also successively expanded to media such as voices, images, and moving images. It is assumed that data will be further varied in the future.

In order to accommodate to the data variety, it is required that a transmission system can efficiently and flexibly transmit multi-media data.

2. Description of the Related Art

FIG. 21 shows an STS-N (N=1, 3, 12, 48, 192, and 768) frame in a conventional SONET/SDH optical transmission system. This STS-N frame is formed of 9 rows×(90×N) columns bytes comprising an overhead (hereinafter, occasionally abbreviated as OH) of 9 rows×(3×N) columns bytes and a payload (Synchronous Payload Envelope: hereinafter, occasionally abbreviated as SPE) of 9 rows×(87×N) columns bytes.

The OH comprises A1 and A2 bytes for frame synchronization located at the first row and an AU pointer (Administrative Unit Pointer: hereinafter, occasionally abbreviated as PTR) composed of H1-H3 bytes located at the forth row, or the like.

FIG. 22 shows a low-speed STS-1 frame in case N=1 in the above-mentioned STS-N frame. This STS-1 frame is formed of 9 rows×90 columns comprising a TOH (Transport Overhead) of 9 rows×3 columns bytes including a single set of H1, H2, H3 bytes or the like, and an SPE of 9 rows×87 columns bytes. Accordingly, a bit rate of the STS-1 frame is 9×90×8 bits/125 μs=51.84 Mbps.

Furthermore, FIG. 22 shows a virtual container accommodated in the STS-1 frame. This virtual container comprises a Path Overhead (hereinafter, occasionally abbreviated as POH) of 9 rows×1 column bytes composed of J1, B3, C2 bytes or the like and a payload portion of 9 rows×86 columns bytes.

FIG. 23 shows an example of a path alarm detected based on the above-mentioned H1, H2, C2, B3 bytes or the like. The path alarm includes LOP (Loss of Pointer) and PAIS (Path Alarm Indication Signal) based on the H1 and H2 bytes, UNEQ (STS Path Unequipped), PLM (STS Payload Label Mismatch) and PDI (STS Payload Defect Indication) based on the C2 byte, and B3MAJ (B3 (CV-P; Code Violation-Path) Major Alarm), B3MIN (B3 (CV-P; Code Violation-Path) Minor Alarm) and the like based on the B3 byte.

In the same way as FIG. 22, when N is assumed to be 192 in the STS-N frame of FIG. 21, the frame is a high-speed STS-192 frame. This STS-192 frame is formed of 9 rows× (90×192) columns bytes comprising OH of 9 rows×(3×192) columns bytes including the AU pointer or the like further comprising 192 sets of H1, H2, and H3 bytes and SPE of 9 rows×(87×192) bytes. Accordingly, the bit rate of the STS-192 frame is 9×90×192 channels×8 bits/125 μs=9.95 Gbps.

FIG. 24 shows a transmission (multiplexing) order when 192 channels are transmitted by the STS-192 frame with the STS-1 being regarded as 1 channel. The STS-1×192 channels (CH1-CH192) are sequentially hierarchized into the STS-3, STS-12, STS-48, and STS-192 by byte interleave to be multiplexed.

In the conventional SONET/SDH optical transmission system (OC-N (N=1, 3, 12, 48, and 192)), for the transmission of data traffic having capacity corresponding to an STS-Mc (M=1, 2, . . . , and N), it has been required to secure a concatenation area of an STS-Lc (L=1, 3, 12, 48, and 192).

Furthermore, mapping of the STS-Lc into the OC-N can not be performed to arbitrary STS-1×L channels, but can be performed only to consecutive channels CHK, CH(K+1), . . . , and CH(K+L−1) (K=j*L+1; j=0, 1, 2, . . . , and N/L−1).

Accordingly, in spite of the existence of idle channels of more than L channels in the OC-N, mapping of the STS-Lc can not be performed in some cases, which leads to lack of systematic flexibility.

For this reason, manual operations by operators for systematically assigning data traffic to channels based on a prior estimation have been required.

Also, when a concatenation line is newly provided in response to an unexpected request, rearrangement of existing service lines has been required for securing the concatenation area in some cases.

FIGS. 25A-25D show a case where data traffic of 1.2 Gbps (STS-24: 24CH) are mapped into the STS-192 (OC-192) frame by the STS-48c concatenation. It is to be noted that although the STS-1 of CH1-CH192 is multiplexed into the STS-192 as shown in FIG. 24, the channels CH1-CH192 are supposed to sequentially multiplexed in FIGS. 25A-25D, in order to facilitate understanding.

FIG. 25A shows a present channel occupation state. The channels CH2, CH82, CH140, and CH159 are in an occupied state and the other channels are in an idle state.

In order to transmit 1.2 Gbps data traffic corresponding to 24 channels of FIG. 25D by concatenation, the capacity is short in the concatenation area of the STS-12c. Therefore, the concatenation area of the STS-48c, which is in an upper hierarchy than the STS-12c, has to be secured.

Therefore, in order to secure the area of the consecutive channels CH145-CH192 as the STS-48c concatenation area in FIG. 25B, an existing service channel CH159 is rearranged to the channel CH124. Then, as shown in FIG. 25C, the area of the channels CH145-CH192 is secured as the STS-48c concatenation area, and the 1.2 Gbps (STS-24: 24CH) data traffic are mapped into the STS-48c concatenation area.

For executing this, following problems arise: (1) Manual operation by operators is required for a systematic channel assignment; (2) When the 1.2 Gbps data are mapped and transmitted within the optical transmission system, the STS-48c of 2.4 Gbps is required to be assigned, and channels for 1.2 Gbps (≈2.4 Gbps-1.2 Gbps) are wasted; (3) Instantaneous interruption of existing service channel occurs concurrently with rearrangement of the channel CH159 to the channel CH124. Also, in the conventional virtual concatenation system, phase synchronization between virtual-concatenated channels is made at a terminal point to be treated as a bulk.

Since virtual slave channels independently generate a pointer action in this system, deviation between payload phases occurs during a transmission through a network. Accordingly, a memory circuit for absorbing the deviation is required. Also, the difference of pointer values between the virtual slave channels is prescribed due to a limitation of the memory capacity, which leads to constraints for constructing the optical transmission network.

SUMMARY OF THE INVENTION

It is accordingly an object of the present invention to provide a method and a device for virtual concatenation transmission which provide a virtual concatenation with an excellent transmission efficiency, specifically which do not waste channels, require little labor of operators, do not cause an instantaneous interruption, and require no memory capacity.

(1) In order to achieve the above-mentioned object, by a virtual concatenation transmission method according to the present invention, a plurality of low-speed frames, multiplexed into arbitrary positions within a high-speed frame and composing a virtual concatenation, are transmitted together with virtual concatenation information indicating a concatenation or link state of positions of the low-speed frames, with a phase relationship being maintained.

The principle of the present invention will now be described referring to FIGS. 1A-1C and 2, in which an OC-192 high-speed frame in a SONET/SDH network will be taken as an example. It is to be noted that FIG. 1A is the same as the conventional example shown in FIG. 25A, and low-speed frames at the positions of channels CH2, CH82, CH140, and CH159 within an OC-192 frame are supposed to be already used for transmitting data.

FIG. 1B shows an example in which series of data of 1.1 Gbps shown in FIG. 1C are divided, and are mapped to 22 low-speed frames, and are multiplexed into the OC-192 high-speed frame.

The order of the low-speed frames upon multiplexing is channels CH50, CH15, CH31-CH33, CH76, CH47, CH163, CH109-CH120, CH177, and CH143 from the head of the data. The channels CH31-CH33 and CH109-CH120 will be described later.

FIG. 2 shows an example of virtual concatenation information, which shows positions to which the low-speed frames are multiplexed, i.e. a concatenation state (channels CH50-CH15-CH31 . . . CH33-CH76-CH47-CH63-CH109 . . . CH120-CH177-CH143) of the channels.

In the virtual concatenation transmission method of the present invention, the frames are thus multiplexed into the high-speed frame to be transmitted with a phase relationship between a plurality of (22) low-speed frames composing the virtual concatenation being maintained.

According to this virtual concatenation transmission method of the present invention, the channel positions of the low-speed frames can be arbitrarily multiplexed into idle positions (including dispersed positions and consecutive positions). Therefore, it is not necessary to secure consecutive channel positions by moving data from a channel already used to another channel, like the conventional concatenation, and an instantaneous interruption by the channel move does not occur.

Also, in order to transmit series of data, it is sufficient to secure channels of the number of minimum low-speed frames which can accommodate the series of data, thereby wasting no channel. Also, based on the virtual concatenation information, it is possible to easily restore original data from virtually concatenated low-speed frames.

Furthermore, since the low-speed frames composing the virtual concatenation are transmitted with the phase relationship being maintained, no buffer memory for assembling the deassembled data on the receiving side is required.

(2) Also, in the present invention according to the above-mentioned invention (1), the low-speed frames composing the virtual concatenation may be multiplexed from the high-speed frame into another high-speed frame, based on the concatenation information, with the concatenation state and the phase relationship being maintained.

Namely, when a clock change is performed from a receiving clock to an internal clock, it is required to change a plurality of low-speed frames composing the virtual concatenation from the high-speed frame operating in synchronization with the receiving clock to another high-speed frame operating based on the internal clock.

In this case, the low-speed frames composing the virtual concatenation according to the present invention can be changed to another high-speed frame with the concatenation state and the phase relationship indicated by the virtual concatenation information being maintained.

(3) Also, in the present invention according to the above-mentioned invention (1) or (2), the phase relationships between the low-speed frames composing the virtual concatenation may be a same phase.

Thus, no buffer memory for assembling the disassembled data on the receiving side is required and assembling becomes easy.

It is to be noted that "the same phase" means that pointer values in e.g. SONET/SDH frames are the same, but does not mean that the phases are completely the same.

(4) Also, in the present invention according to the above-mentioned invention (2), with reference to a position of a head low-speed frame, the other low-speed frames may be multiplexed into positions where the phase relationship is maintained.

(5) Also, in the present invention according to the above-mentioned invention (2), the position information within the virtual concatenation information may be replaced with position information of the low-speed frames multiplexed into the other high-speed frame.

Namely, when the low-speed frames composing the virtual concatenation are changed to the channel positions of another high-speed frame, the previous channel positions (e.g. channel Nos.) may be different from the channel positions after the change.

Therefore, the position information of the virtual concatenation information is replaced with the position information (channel No.) corresponding to the changed high-speed frame.

Thus, it becomes possible to make the virtual concatenation information correspond to the changed high-speed frame.

(6) Also, in the present invention according to the above-mentioned invention (2), in synchronization with positive/negative stuff of a head low-speed frame, positive/negative stuff processing of the other low-speed frames may be performed and the low-speed frames may be multiplexed. Thus, even if positive/negative stuff processing occurs, a phase relationship between the low-speed frames composing the virtual concatenation can be maintained.

(7) Also, in the present invention according to the above-mentioned invention (1), the low-speed frames may comprise low-speed frames where a plurality of low-speed frames are concatenated.

Namely, as shown in FIG. 2, the channels CH31-CH33 and CH109-CH120 respectively compose the low-speed frames of the conventional consecutive concatenations STS-3cCH11 and STS-12cCH10. Thus, the virtual concatenation according to the present invention can have the conventional consecutive concatenated low-speed frames as components.

(8) Also, in the present invention according to the above-mentioned invention (1), the virtual concatenation information may be added in an overhead of the high-speed frame.

FIG. 3 shows an example in which the virtual concatenation information is added in an idle area of an overhead of a high-speed frame. A virtual concatenation ① corresponds to the virtual concatenation information shown in FIG. 2.

(9) Also, in the present invention according to the above-mentioned invention (1), the virtual concatenation information may be added in a pointer of the overhead, which indicates a head position of each low-speed frame, and may comprise a linear list which designates a position into which a subsequent low-speed frame concatenated to each low-speed frame is multiplexed, with a value out of range of offset values set to the pointer.

FIG. 4 shows a principle of the present invention and an example where the virtual concatenation information shown in FIG. 2 is added in the pointer. The concatenation state of the channels (positions of low-speed frames) is indicated by adding e.g. the channel CH47, which is concatenated to the channel CH163 in the direction of the head channel CH50, in the pointer corresponding to the channel CH163.

In the pointer of the head channel CH50 (head low-speed frame), a normal pointer value (norm: offset value) is added, thereby enabling a head channel to be identified.

FIG. 5 shows an example of the virtual concatenation information (linear list) according to the present invention. Based on a definition of a pointer shown in FIGS. 7A-7C as will be described later, the linear list designates, in the pointer (H1/H2 byte) of the SONET/SDH, e.g. the pointer (H1/H2 byte) corresponding to the channel CH177 (low-speed frame), a position (channel CH109 (=0393h)) into which the previous low-speed frame concatenated to the low-speed frame (channel CH177) is multiplexed with a value (783-1023) out of the range (0-782) of the normal offset value set to the pointer.

(10) Also, in the present invention according to the above-mentioned invention (9), when any of the pointers corresponding to the low-speed frames composing the virtual concatenation indicates an alarm, the pointers corresponding to the other low-speed frames may be made to indicate an alarm.

Namely, an alarm indication of the low-speed frames composing the virtual concatenation is regarded as an alarm indication by the virtual concatenation.

(11) Also, in the present invention according to the above-mentioned invention (9), when the virtual concatenation information indicates a circulating concatenation state, the pointers corresponding to all of the low-speed frames composing the virtual concatenation may be made to indicate an alarm.

Namely, when the virtual concatenation information indicates a circulating concatenation state (channels CH12-CH8-CH35-CH12) ③ of FIG. 3, an alarm is indicated in the pointers of all of the channels CH12, CH8, and CH35.

(12) Also, in the present invention according to the above-mentioned invention (1), an alarm indication which has occurred in the low-speed frame composing the virtual concatenation may be processed by the low-speed frame or the virtual concatenation.

(13) Also, in the present invention according to the above-mentioned invention (1), based on time slot assignment setting information, the positions of the low-speed frames composing the virtual concatenation may be converted, and the position information within the virtual concatenation information may be replaced.

Namely, when a time slot assignment is set, the positions (channels) of the low-speed frames composing virtual concatenation are converted based on the time slot assignment setting. Together with this conversion, it is required to replace the position information within the virtual concatenation information.

(14) Also, in the present invention according to the above-mentioned invention (1), when any one of the low-speed frames composing the virtual concatenation indicates an alarm, a path may be switched over to another path by the virtual concatenation.

Namely, when one of the low-speed frames composing the virtual concatenation indicates an alarm requiring a path switchover, the path switchover is performed not only at the low-speed frame in which an alarm is indicated but also all of the low-speed frames composing the virtual concatenation.

(15) Also, in the present invention according to the above-mentioned invention (1), upon path switchover, the low-speed frames composing the virtual concatenation may switch a path over to a path of a same direction as a head low-speed frame by the virtual concatenation.

Thus, transmission/reception of the low-speed frames composing the virtual concatenation by paths of different directions from each other is avoided, thereby enabling transmission of the low-speed frames with the phase relationship being maintained.

(16) Also, in the present invention according to the above-mentioned invention (1), the high-speed frame and the low-speed frame may comprise SONET/SDH frames.

(17) Also, in the present invention according to the above-mentioned invention (16), a line may be switched by a position replacement of adding N/2 to the position information within the virtual concatenation information, in a 2F-BLSR ring network in which the high-speed frame is an STS-N (N=12, 48, 192, and 768) frame. Thus, the virtual concatenation information on the ring network can be maintained.

(18) Also, in the present invention according to the above-mentioned invention (16), a line may be switched by a position replacement of subtracting N/2 from the position information within the virtual concatenation information, in a 2F-BLSR ring network in which the high-speed frame is an STS-N (N=12, 48, 192, and 768) frame. Thus, the virtual concatenation information on the ring network can be maintained.

(19) Also, in the present invention according to the above-mentioned invention (1), the virtual concatenation information may be set.

(20) Furthermore, in order to realize the above-mentioned virtual concatenation transmission method, a virtual concatenation transmission device according to the present invention transmits a plurality of low-speed frames, multiplexed into arbitrary positions within a high-speed frame and composing a virtual concatenation, together with virtual concatenation information indicating a concatenation or link state of positions of the low-speed frames, with a phase relationship being maintained.

(21) Also, the present invention according to the above-mentioned invention (20) may further comprise a frame processor multiplexing the low-speed frames into dispersed positions from the high-speed frame to another high-speed frame, based on the concatenation information, with the phase relationship being maintained.

It is to be noted that this frame processor may occasionally referred to as a pointer processor in the embodiment described later.

(22) Also, in the present invention according to the above-mentioned invention (20) or (21), the phase relationships between the low-speed frames composing the virtual concatenation may be a same phase.

(23) Also, in the present invention according to the above-mentioned invention (21), the frame processor may multiplex, with reference to a position of a head low-speed frame, the other low-speed frames into positions where the phase relationship is maintained.

(24) Also, the present invention according to the above-mentioned invention (21) may further comprise a virtual concatenation information converter replacing the position information within the virtual concatenation information with position information of the low-speed frames multiplexed into the other high-speed frame.

(25) Also, in the present invention according to the above-mentioned invention (21), the frame processor may perform, in synchronization with positive/negative stuff of a head low-speed frame, positive/negative stuff processing of the other low-speed frames and may multiplex the low-speed frames.

(26) Also, in the present invention according to the above-mentioned invention (20), the low-speed frames may comprise low-speed frames where a plurality of low-speed frames are concatenated.

(27) Also, in the present invention according to the above-mentioned invention (20), the virtual concatenation information may be added in an overhead of the high-speed frame.

(28) Also, in the present invention according to the above-mentioned invention (27), the virtual concatenation information may be added in a pointer of the overhead, which indicates a head position of each low-speed frame, and may comprise a linear list which designates a position into which a subsequent low-speed frame concatenated to each low-speed frame is multiplexed, with a value out of range of offset values set to the pointer.

(29) Also, in the present invention according to the above-mentioned invention (28), when any of the pointers corresponding to the low-speed frames composing the virtual concatenation indicates an alarm, the pointers corresponding to the other low-speed frames may be made to indicate an alarm.

(30) Also, in the present invention according to the above-mentioned invention (28), when the virtual concatenation information indicates a circulating concatenation state, the pointers corresponding to all of the low-speed frames composing the virtual concatenation may be made to indicate an alarm.

(31) Also, in the present invention according to the above-mentioned invention (20), an alarm indication which has occurred in the low-speed frame composing the virtual concatenation may be processed by the low-speed frame or the virtual concatenation.

(32) Also, the present invention according to the above-mentioned invention (20) may further comprise a time slot assignment portion (hereinafter, occasionally abbreviated as TSA portion) converting the positions of the low-speed frames composing the virtual concatenation based on predetermined time slot assignment setting information, and replacing the position information within the virtual concatenation information.

(33) Also, the present invention according to the above-mentioned invention (20) may further comprise a path switch switching a path over to another path by the virtual concatenation when any one of the low-speed frames composing the virtual concatenation indicates an alarm.

(34) Also, the present invention according to the above-mentioned invention (20) may further comprise a service selector switching a path by the virtual concatenation when any one of the low-speed frames composing the virtual concatenation indicates an alarm.

(35) Also, the present invention according to the above-mentioned invention (20) may further comprise a service selector switching the low-speed frames composing the virtual concatenation over to a path of a same direction as a head low-speed frame by the virtual concatenation upon path switchover.

(36) Also, the present invention according to the above-mentioned invention (20) may further comprise a path switch switching the low-speed frames composing the virtual concatenation over to a path of a same direction as a head low-speed frame by the virtual concatenation upon path switchover.

(37) Also, in the present invention according to the above-mentioned invention (20), the high-speed frame and the low-speed frame may comprise SONET/SDH frames.

(38) Also, the present invention according to the above-mentioned invention (37) may further comprise a ring bridge switching a line by a position replacement of adding N/2 to the position information within the virtual concatenation information, in a 2F-BLSR ring network in which the high-speed frame is an STS-N (N=12, 48, 192, and 768) frame.

(39) Also, the present invention according to the above-mentioned invention (37) may further comprise a ring switch switching a line by a position replacement of subtracting N/2 from the position information within the virtual concatenation information, in a 2F-BLSR ring network in which the high-speed frame is an STS-N (N=12, 48, 192, and 768) frame.

(40) Also, in the present invention according to the above-mentioned invention (20), the virtual concatenation information may be set.

By the above-mentioned means, an end-to-end transmission function on various kinds of SONET/SDH optical networks including e.g. a BLSR/UPSR ring network can be realized with the phase relationship between the low-speed frames (channels) composing the virtual concatenation being maintained.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 1A-1C are diagrams showing a principle of a virtual concatenation transmission method according to the present invention;

FIG. 5 is a diagram showing an example of virtual concatenation information (linear list) in a virtual concatenation transmission method according to the present invention;

FIGS. 7A-7C are diagrams showing a definition of H1/H2/H3 bytes in a virtual concatenation transmission method according to the present invention;

FIG. 11 is a block diagram showing an embodiment of a TSA portion with linear list conversion function in a virtual concatenation transmission device according to the present invention;

FIGS. 12A-12C are diagrams showing an example of linear list replacement processing in a TSA portion with linear list conversion function of a virtual concatenation transmission device according to the present invention;

FIG. 13 is a block diagrams showing an embodiment of a ring bridge with linear list conversion function in a virtual concatenation transmission device according to the present invention;

FIGS. 14A-14C are diagrams showing an example of linear list replacement processing in a ring bridge with linear list conversion function in a virtual concatenation transmission device according to the present invention;

FIG. 15 is a block diagram showing an embodiment of a ring switch with linear list conversion function in a virtual concatenation transmission device according to the present invention;

FIGS. 16A-16C are diagrams showing an example of linear list replacement processing in a ring switch with linear list conversion function in a virtual concatenation transmission device according to the present invention;

FIG. 23 is a diagram showing a path (channel) alarm in the conventional SONET/SDH network;

FIGS. 25A-25D are diagrams showing an example of data multiplexing based on the conventional concatenation.

DESCRIPTION OF THE EMBODIMENTS

Figure 6:
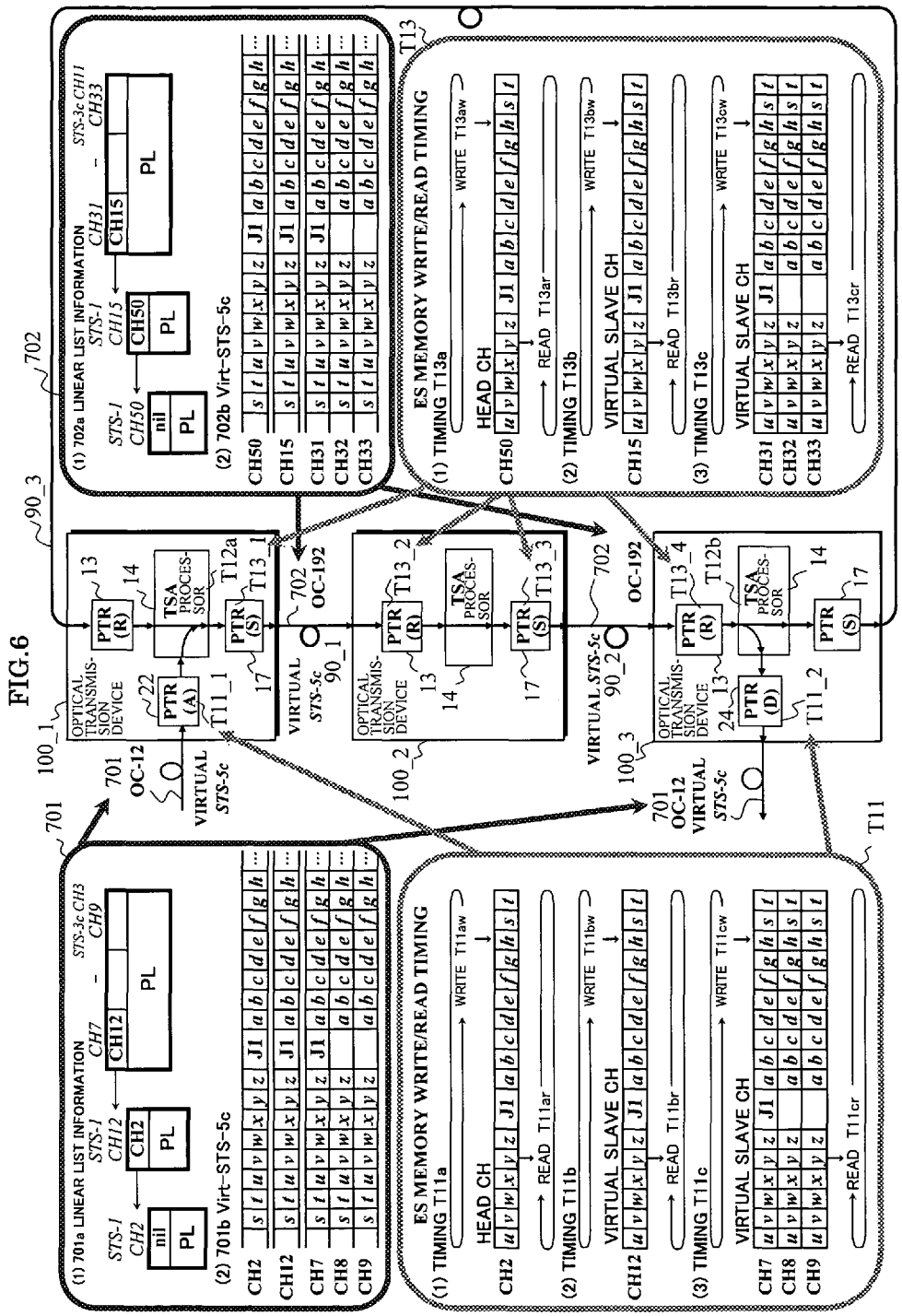
FIG. 6 is a block diagram showing an example of a virtual concatenation transmission in a ring network example composed of a virtual concatenation transmission device according to the present invention.

FIG. 6 shows an example of an SONET/SDH network. This network is a ring network in which virtual concatenation optical transmission devices 100_1-100_3 (hereinafter, occasionally represented by a reference numeral 100) according to the present invention are connected with optical fibers 90_1-90_3 like a ring. It is to be noted that only a working ring is shown in FIG. 6 and a protection ring is omitted for convenience sake.

Each optical transmission device 100 is an add/drop multiplexer (ADM) and is provided with an OC-192 receiving side pointer processor (hereinafter, occasionally abbreviated as PTR(R)) 13, a TSA (Time Slot Assignment) portion 14, and an OC-192 transmitting side pointer processor (frame processor: hereinafter, occasionally abbreviated as PTR(S)) 17 connected in cascade, and an OC-12 adding side pointer processor (hereinafter, occasionally abbreviated as PTR(A)) 22 and an OC-12 dropping side pointer processor (hereinafter, occasionally abbreviated as PTR(D)) 24 connected to the TSA portion 14.

It is to be noted that in FIG. 6, one or both of the adding side pointer processor 22 and the dropping side pointer processor 24 of the optical transmission device 100 are not shown for the convenience sake.

The optical transmission device 100 transmits traffic between devices with an OC-192 (9.95 Gbps) interface, and adds/drops the traffic in/from a tributary side with an OC-12 (622 Mbps) interface.

Hereinafter, operation will be described that traffics of a virtual concatenation STS-5c (hereinafter, referred to as Virt-STS-5c) added from the OC-12 tributary side of the optical transmission device 100_1 are transmitted within an OC-192 ring network and is dropped as unchanged Virt-STS-5c to the OC-12 tributary side of the optical transmission device 100_3.

In the optical transmission device 100_1, the PTR(A) 22 inputs, from the tributary side, a virtual concatenation (Virt-STS-5c: see (2) of information 701 in FIG. 6; hereinafter, occasionally referred to as Virt-STS-5c) 701b composed of a head channel CH2 of an STS-1, a virtual slave channel CH12 of the STS-1, a virtual slave channel CH3 of an STS-3c (concatenation of channels CH7-CH9 of the STS-1), and linear list information (virtual concatenation information) 701a (see (1) of information 701 in FIG. 6) for the Virt-STS-5c701b.

In the PTR(A) 22, pointer processing of the STS-1 virtual slave channel CH12 and the STS-3c virtual slave channel CH3 is performed based on the linear list information 701a of the Virt-STS-5c701b added, in synchronization with the pointer processing of the head channel CH2.

A timing T11 in FIG. 6 shows a write/read timing of an ES memory (not shown) 31 within the PTR(A) 22. At a write timing T11aw of a timing T11(1), a write timing T11bw of a timing T11(2), and a write timing T11cw of a timing T11(3), the head channel CH2, the virtual slave channel CH12, and the virtual slave channels CH7-CH9 (=STS-3cCH3) are respectively written in the ES memory 31.

At a read timing T11ar of the timing T11(1), a read timing T11br of the timing T11(2), and a read timing T11cr of the timing T11(3), the head channel CH2, the virtual slave channel CH12, and the virtual slave channels CH7-CH9 (=STS-3cCH3) are respectively read from the ES memory 31, and are respectively multiplexed into a channel CH50, a channel CH15, and channels CH31-CH33 of the OC-192 interface with the phase relationship (same phase in information 702 (2) in FIG. 6) being maintained.

Thus, the phase coincidence of path traces J1 of a POH (Path Overhead) in the head channel CH2, the STS-1 virtual slave channel CH12, and the STS-3c virtual slave channel CH3 is maintained.

In the optical transmission device 100_1, the TSA portion 14 replaces a linear list of channel Nos. (CH2, CH12, and CH7-CH9) before the TSA portion 14 on the OC-12 tributary side with the linear list of channel Nos. (CH50, CH15, and CH31-CH33) after the TSA portion 14 on the OC-192 side.

The linear list information after the replacement is shown in (1) linear list information 702a of the information 702 in FIG. 6.

Thus, the virtual concatenation Virt-STS-5c is maintained in the OC-192 network.

Then, the pointer processing of the virtual slave channel CH is controlled in synchronization with the pointer processing of the head channel CH based on the linear list information 702a after the replacement at the PTR(S)17 of the optical transmission device 100_1, at the PTR(R)13 and the PTR(S) 17 of the optical transmission device 100_2, and at the PTR (R)13 of the optical transmission device 100_3, and the virtual concatenation Virt-STS-5c is inputted to the TSA portion 14 of the optical transmission device 100_3 with the phase coincidence between the path traces J1 of the POH in the channels being maintained.

At the optical transmission device 100_3, the TSA portion 14 replaces the linear list of the channel Nos. before the TSA portion 14 with the linear list of the channel Nos. after the TSA portion 14 (see (1) linear list information 701a of information 701). The PTR(D) 24 performs the pointer processing based on the linear list information 701a replaced twice, and drops the Virt-STS-5c to the tributary side (see (2) Virt-STS-5c701b of information 701).

Thus, in the network composed of the virtual concatenation transmission device 100 according to the present invention, the pointer processing of the virtual slave channel is synchronized with the pointer processing of the head channel based on the linear list information received at all of the pointer processors (PTR(R) 13, PTR(S) 17, PTR(A), and PTR(D)) on the network.

Also, at the TSA portion 14 including an ADM function between the low-speed side and the high-speed side, the replacement of the linear list of the channel Nos. before the TSA portion 14 with the linear list of the channel Nos. after the TSA portion is performed according to a line setting.

Namely, the linear list indicating the virtual concatenation is maintained, and all of the pointer processing on the network is synchronously controlled. Thus, the phase coincidence between the path traces J1 in the channels composing the end-to-end virtual concatenation in the network can be realized.

FIGS. 7A-7C show an embodiment in which the linear list information is added in a 10-bit pointer value (IDIDIDIDID) range of H1/H2 bites. FIG. 7A shows a definition of H1/H2/H3 pointers within a SONET/SDH frame. FIG. 7B shows definitions of pointer bytes corresponding to the virtual concatenation according to the present invention. FIG. 7C shows a specific designation method of the virtual concatenation channel.

The H1/H2/H3 pointers are composed of an H1 byte, an H2 byte, and an H3 byte as shown in FIG. 7A. Bits b1-b4 in the H1 byte are New Data Flag (NDF) bits 601, bits b5 and b6 in the H1 byte are SS bits 602, bits b7 and b8 in the H1 byte and bits b1-b8 in the H2 byte are a 10-bit pointer value 603. The H3 byte is a Negative Justification Opportunity 604, and 1 byte within an SPE after the H3 byte is Positive Justification Opportunity 605.

The bit b7 in the H1 byte and the bits b1, b3, b5, and b7 in the H2 byte within the 10-bit pointer value are Increment bits (I bits), and the bit b8 in the H1 byte and the bits b2, b4, b6, and b8 in the H2 byte are Decrement bits (D bits).

The definitions of the pointer bytes in items (11)-(16), and (18) in FIG. 7B are existing definitions, so that the explanation thereof is omitted. It is to be noted that an NDF enable of NDF (NNNN) is a code in which equal to more than 3 bits coincide with "1001" i.e. "1001", "0001", "1101", "1011", or "1000". A normal NDF is a code except the NDF enable. Also, "—" of the SS bit means "don't care".

An item (17) shows a definition of the linear list information of the virtual concatenation according to the present invention. The linear list information is added in the H1/H2 bytes, where NDF="NDF enable", SS bit="don't care (normally "00h")", and the 10-bit pointer value="bit inversion of channel No. previously concatenated" are set.

By this setting, a part of code of the first condition of an invalid pointer in the item (18) is assigned to an indication of the virtual concatenation of the present invention in the item (17). Also, in order to avoid overlaps in the head channel between the NDF enable in the item (12) and the conventional concatenation indication in the item (16), a reverse order linear list is adopted. The linear list information by this definition can support STS-3 . . . STS-192 frames.

Items (19)-(22) in FIG. 7C specifically show the definitions shown in items (16)-(18), and (12) in FIG. 7B respectively, and show specific values, their meanings, and reception states of the H1/H2 bytes (NDF bits, SS bits, 10-bit pointer value (IDIDIDIDID)).

Accordingly, the item (20) shows an embodiment of the linear list information of the virtual concatenation according to the present invention. It is to be noted that "N" shown in the items (20) and (21) is the largest channel No. which can be included in the virtual concatenation, and is the same value as "N" of the OC-N. For example, in the OC-192, N=192.

It is to be noted that when the conventional concatenation is composed of a plurality of low-speed frames, the maximum number of channels which can be included in the virtual concatenation increases.

Thus, by assigning a part of the invalid pointer values within the H1/H2 bytes to the virtual concatenation, it becomes unnecessary to newly set the range for the linear list on an OH.

Figure 2:
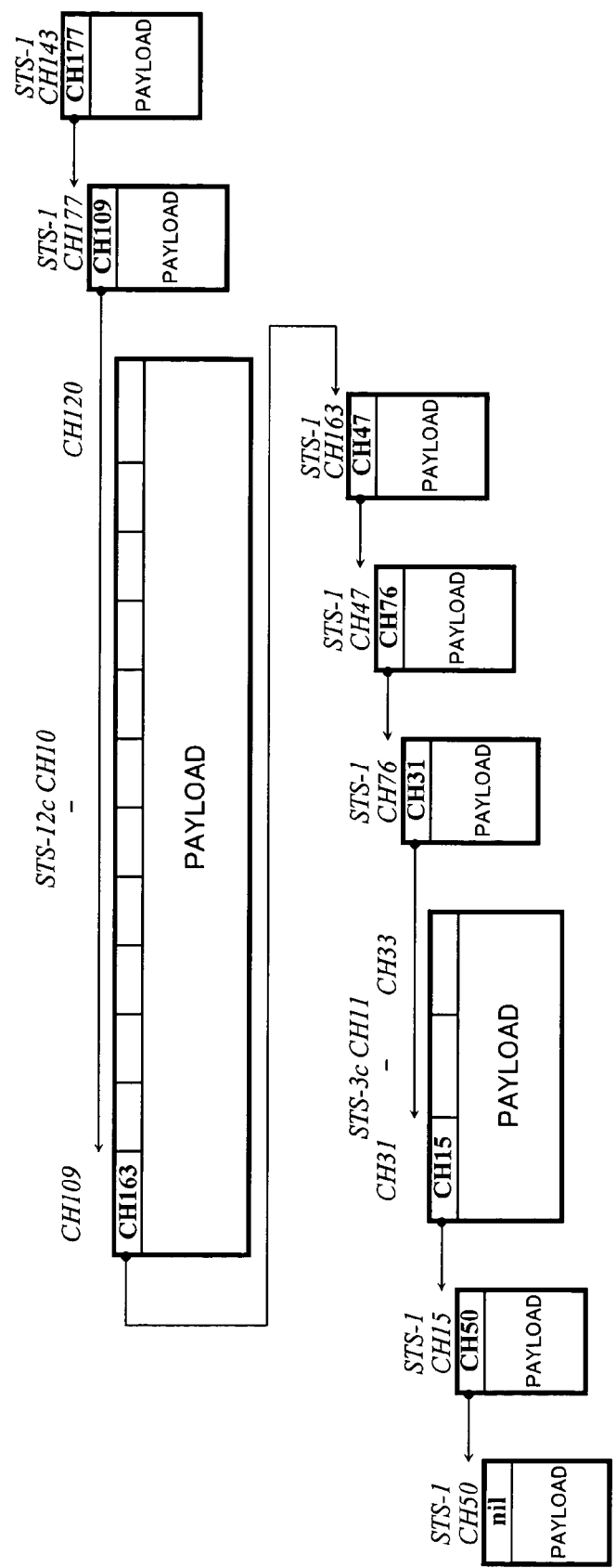
FIG. 2 is a diagram showing a principle of a virtual concatenation transmission method according to the present invention.
Figure 3:
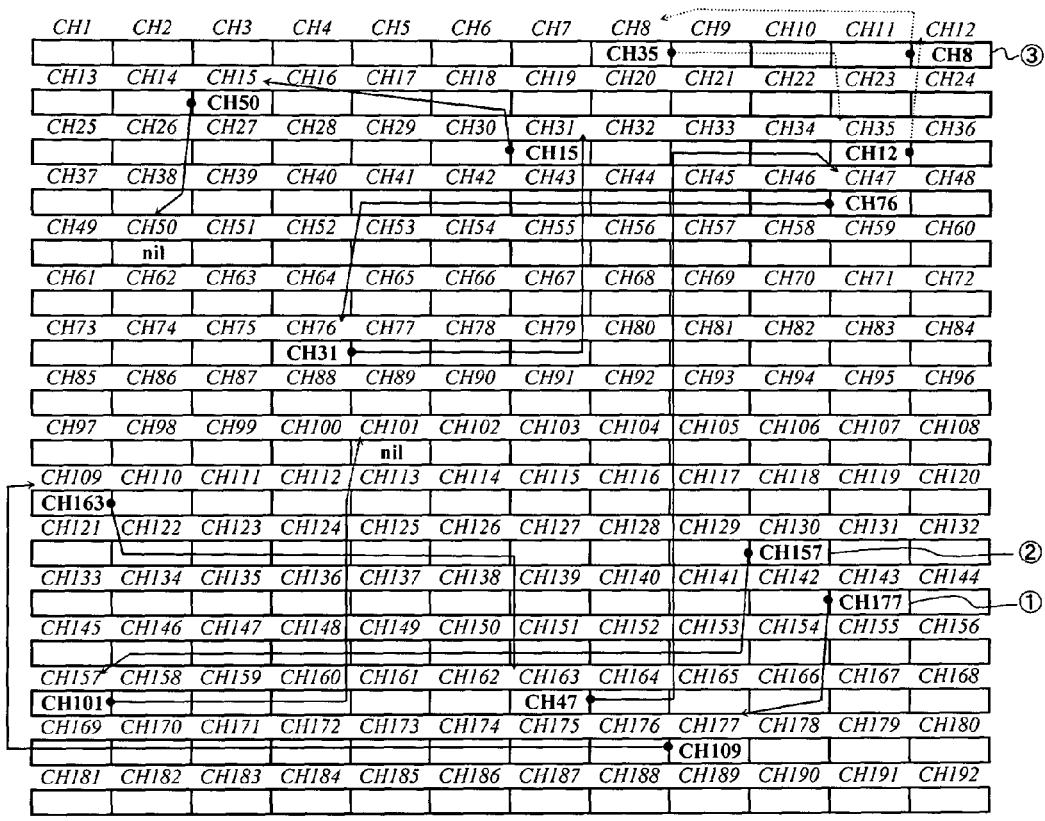
FIG. 3 is a diagram showing an example of a virtual concatenation channel assigned based on a principle of a virtual concatenation transmission method according to the present invention.
Figure 4:
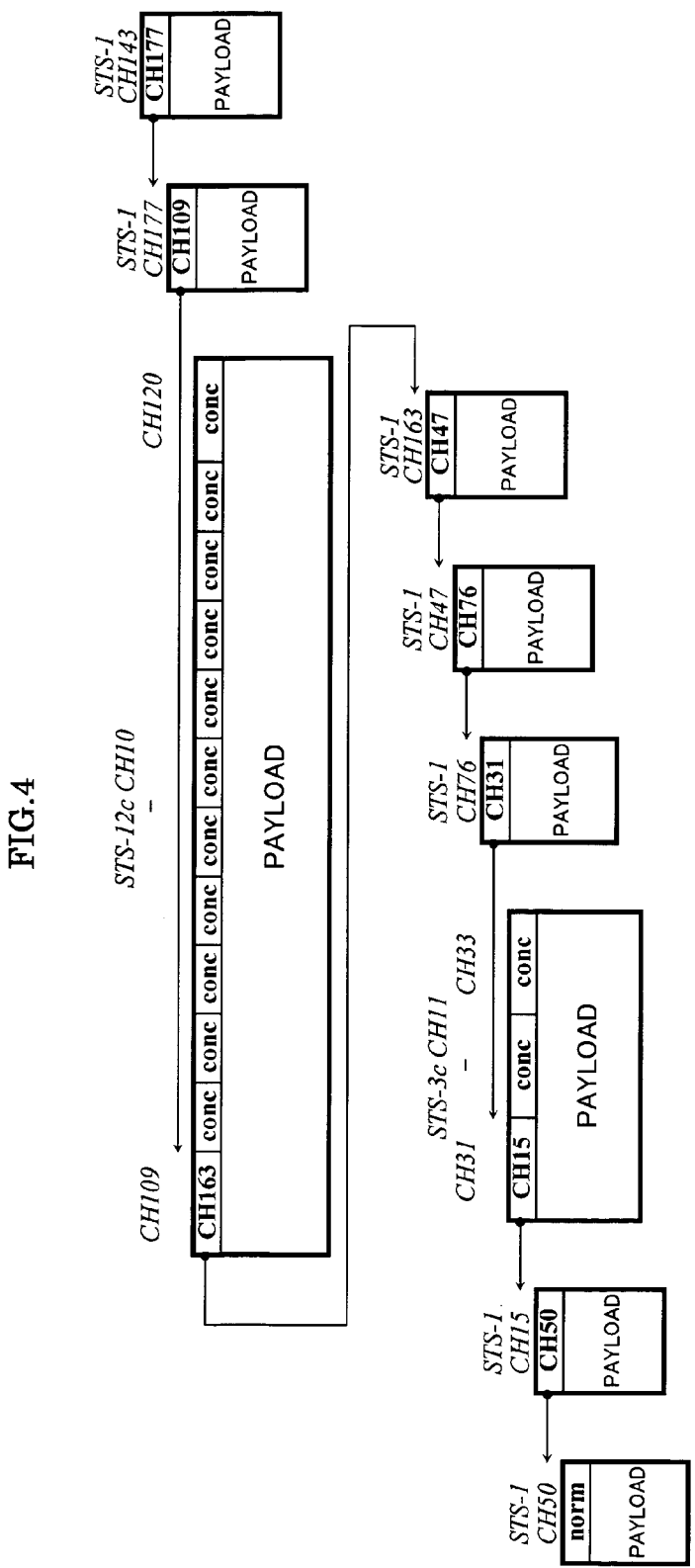
FIG. 4 is a diagram showing a principle of a virtual concatenation transmission method according to the present invention.

FIG. 4 previously described is a conceptual diagram in which the linear list information corresponding to mapping of 1.1 Gbps data shown in FIG. 1B is added in the H1/H2 bytes based on the above definition. FIG. 5 is a diagram showing specific values of the H1/H2 bytes. For example, to the H1/H2 bytes of the channel CH143, NDF="1001", SS bits="00", and the 10-bit pointer value="bit inversion value "1101001110" of channel No.=177 (="0010110001") before channel CH143" are set.

Also, to the head channels CH31 and CH109 of the channels CH31-CH33 and channels CH109-CH120 respectively composing the conventional concatenations STS-3c and STS-12c, the bit inversion values of the previous channel Nos. are respectively set based on the item (17) of FIG. 7B. To the H1/H2 bytes of the other channels CH32, CH33, CH110-CH120, the conventional concatenation indication="1001SS1111111111"="93h, FFh (in case of SS="00")" of the item (16) in FIG. 7B are set. Also, the H1/H2 bytes of the head channel CH50, an active pointer defined by the item (11) in FIG. 7B is set.

Thus, by adopting the reverse direction linear list added in the H1/H2 bytes of the virtual slave channel, the H1/H2 bytes of the head channel is easily retrieved from the H1/H2 bytes of the virtual slave channel. Synchronous processing of the head channel and the virtual slave channels concatenated thereto with the linear list is made possible.

Figure 8:
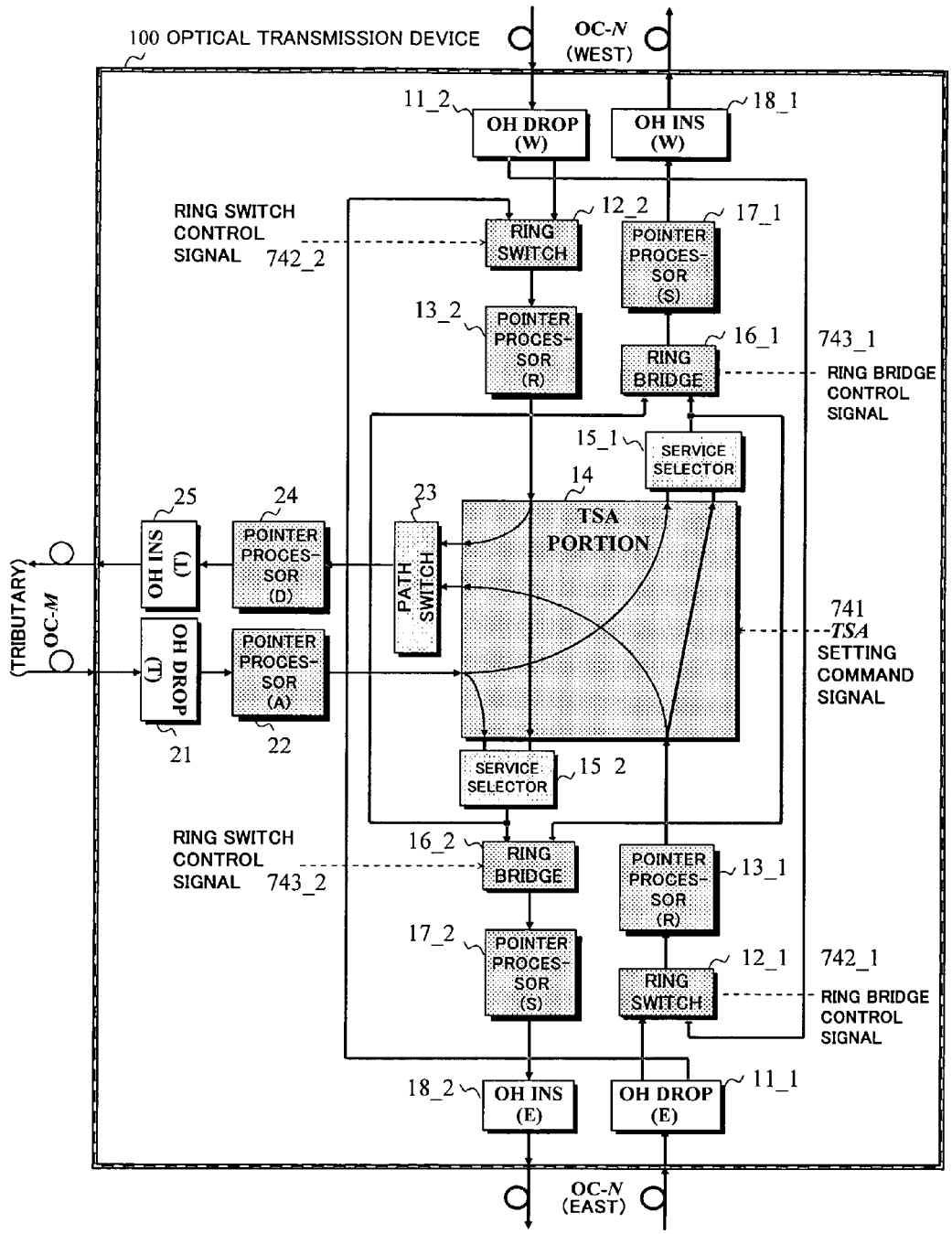
FIG. 8 is a block diagram showing an embodiment of a virtual concatenation transmission device according to the present invention.

FIG. 8 shows a more specific embodiment of the optical transmission device 100 shown in FIG. 6.

In the optical transmission device 100, an OC-N frame inputted from an east side is terminated at an OH drop portion 11_1, and the pointer processing is performed to the OC-N frame at a receiving side pointer processor 13_1 after passing through a ring switch 12_1. In case of "through" mode, time switching is performed to each channel of the OC-N frame at the TSA portion 14, and the OC-N frame passes through a service selector 15_1 and a ring bridge 16_1 and the pointer processing is performed at a transmitting side pointer processor 17_1. Then, an OH is added at an OH inserter 18_1 to be outputted as a west side OC-N frame.

In case of "drop" mode, a predetermined channel included in the OC-N frame passes through a path switch 23 from the TSA portion 14, and the pointer processing is performed at the pointer processor 24. The OH is added at an OH inserter 25 to be outputted as a tributary side OC-M frame.

In case of "through" mode, the OC-N frame inputted from the west side similarly passes through an OH drop portion 11_2, a ring switch 12_2, a receiving side pointer processor 13_2, the TSA portion 14, a service selector 15_2, a ring bridge 16_2, a transmitting side pointer processor 17_2, and an OH inserter 18_2, to be outputted as an east side OC-N frame.

In case of "drop" mode, a predetermined channel included in the OC-N frame similarly passes through the pointer processor 24 and the OH inserter 25, to be outputted as the tributary side OC-M frame.

It is to be noted that hereinafter, reference numerals 11_1 and 11_2, . . . , 13_1 and 13_2, 15_1 and 15_2, . . . , 18_1 and 18_2 are respectively represented by reference numerals 11, . . . , 13, 15, . . . , 18.

The OC-M frame inputted from the tributary side is terminated at an OH drop portion 21, and added at the TSA portion 14 after the pointer processing at the pointer processor 22. Then the OC-M frame passes through the service selector 15, the ring bridge 16, the pointer processor 17, the OH inserter 18 respectively, and is multiplexed into the west side or east side OC-N frame to be outputted.

The optical transmission device 100 corresponds to the ADM of a 2F-BLSR (Bidirectional Line Switched Ring)/UPSR (Unidirectional Path Switched Ring) ring network, and has a high-speed OC-N ring network and a low-speed OC-M interface. The basic arrangement of the optical transmission device 100 of the present invention is the same as that of the conventional optical transmission device (not shown). However, in the present invention, functions of [1] the pointer processors 13, 17, 22, and 24, [2] the TSA portion 14, [3-1] the reception switching ring bridge 16 of the 2F/4F-BLSR, [3-2] the transmission switching ring switch 12 of the 2F/4F-BLSR, [4] the reception switching path switch 23 of the UPSR, and [5] the service selector 15 are added/changed (hatched portions) respectively shown in FIGS. 9, 11, 13, 15, 17, and 19.

[1] Pointer Processor

Figure 9:
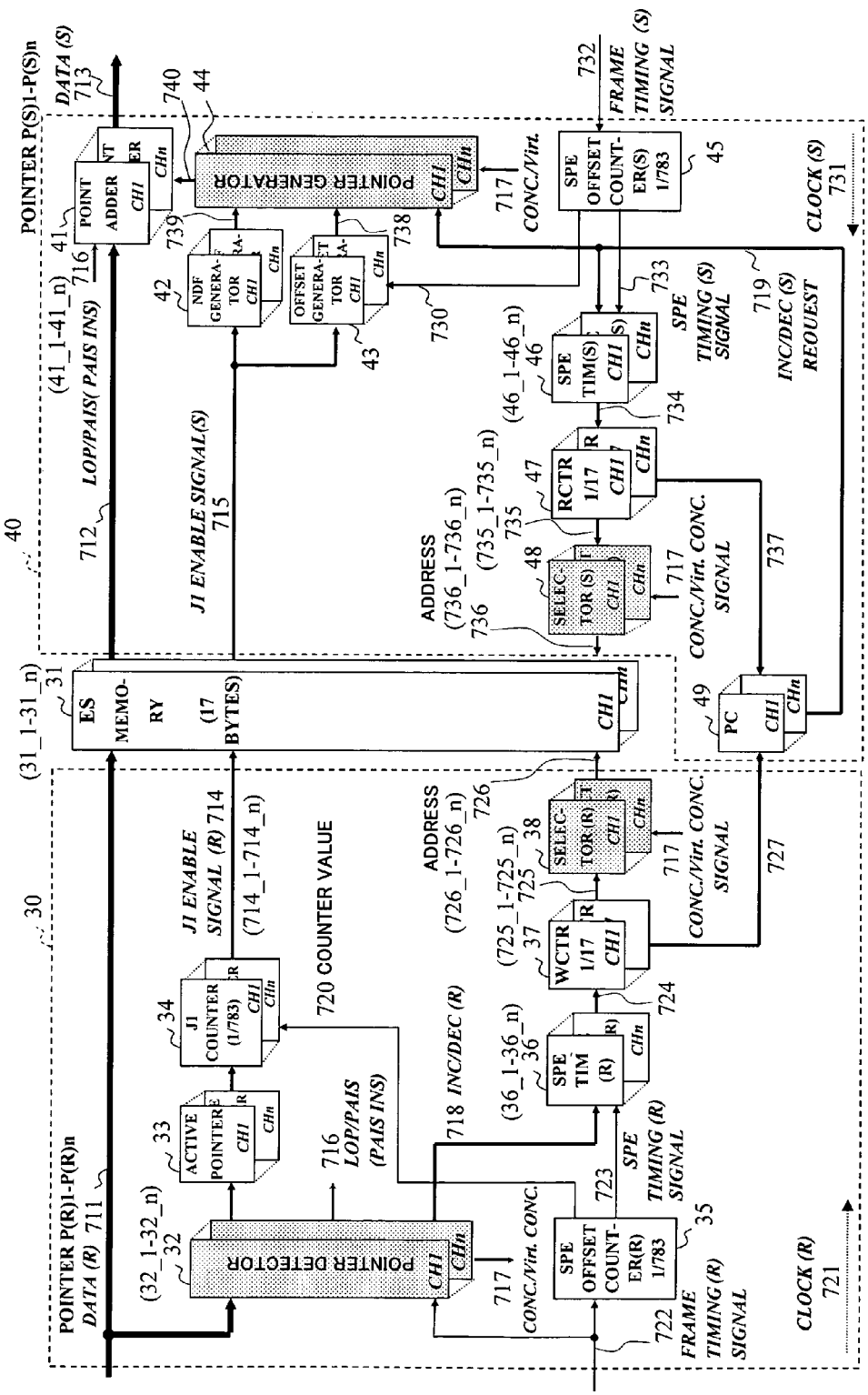
FIG. 9 is a block diagram showing an embodiment of a pointer processor in a virtual concatenation transmission device according to the present invention.

FIG. 9 more specifically shows the pointer processors 13, 17, 22, and 24 shown in FIG. 8. The pointer processors receive input data (R) 711 transmitted by a receiving side high-speed frame STS-N that is the STS-1 channels CH1-CHn (low-speed frames) multiplexed, and transmit data (S) 713 in which receiving pointers P(R)1-P(R)n corresponding to the STS-1 channels included in the data (R) 711 are replaced with transmitting pointers P(S)1-P(S)n corresponding to the transmitting side high-speed frame STS-N.

The basic arrangement of the pointer processor according to the present invention is the same as that of the conventional pointer processor.

Namely, the pointer processor is composed of 17-byte ES memories 31_1-31_$n$ (hereinafter, occasionally represented by a reference numeral 31) respectively corresponding to the STS-1 channels CH1-CHn multiplexed into the input data (R) 711, a receiving side processor 30 which detects the receiving pointers P(R)1-P(R)n and which controls to write the STS-1 channels CH1-CHn data to the corresponding ES memory 31, and a transmitting side processor 40 which controls to read the STS-1 channels CH1-CHn from the ES memory 31 and which transmits the data (S) 713 in which the transmitting pointers P(S)1-P(S)n generated are added in the STS-1 channels CH1-CHn.

The receiving side processor 30 is composed of pointer detectors 32_1-32_$n$, active pointer portions 33_1-33_$n$, J1 counters 34_1-34_$n$, SPE timing (R) portions 36_1-36_$n$, write counters 37_1-37_$n$, selectors (R) 38_1-38_$n$ respectively corresponding to the STS-1 channels CH1-CHn, and an SPE offset counter (R) 35.

The transmitting side processor 40 is composed of pointer inserters 41_1-41_$n$, NDF generators 42_1-42_$n$, offset generators 43_1-43_$n$, pointer generators 44_1-44_$n$, SPE timing (S) portions 46_1-46_$n$, read counters 47_1-47_$n$, selectors (S) 48_1-48_$n$, phase comparators 49_1-49_$n$ respectively corresponding to the STS-1 channels CH1-CHn, and an SPE offset counter (S) 45.

It is to be noted that hereinafter, the reference numerals of the components corresponding to the STS-1 channels CH1-CHn within the components of the receiving side processor 30 and the transmitting side processor 40 are occasionally represented by reference numerals 32-34, 36-38, 41-44, and 46-49, respectively.

The points of the arrangement and operation in which the pointer processor according to the present invention is different from the conventional pointer processor will now be described.

The internal arrangements of the pointer detector 32 and the selector (R) 38 (hatched portion in FIG. 9) of the receiving side processor 30 and the pointer generator 44 and the selector (S) 48 (hatched portion in FIG. 9) of the transmitting side processor 40 are changed to accommodate to the virtual concatenation according to the present invention.

Auto Concatenation and Provisioning Concatenation are supported for the concatenation setting, and the pointer detector 32 and the pointer generator 44 are changed as follows:

Auto Concatenation: The pointer detector 32 detects the linear list information of the virtual concatenation added in the H1/H2 bytes as CONC/Virt. CONC information 717 to be provided to the pointer generator 44. The pointer generator 44 again adds the linear list information in the H1/H2 bytes on the transmitting side.

Provisioning Concatenation: The pointer generator 44 adds the linear list of the virtual concatenation set externally in the H1/H2 bytes.

The selector (R) 38 is changed so as to synchronize the write timing to the ES memory and the stuff processing of the virtual slave channels composing the virtual concatenation of the present invention with the pointer processing of the head channel, based on the CONC/Virt. CONC information 717.

Similarly, the selector (S) 48 is changed so as to synchronize the read timing from the ES memory and the stuff processing of the virtual slave channels with the pointer processing of the head channel.

An alarm indication concerning the virtual concatenation is added as follows:

When a LOP/PAIS is detected at the channel composing the virtual concatenation, the pointer inserter 41 transmits the PAIS as a LOPv/PAISv to each channel composing the virtual concatenation. However, a notification of the LOPv/PAISv by the virtual concatenation is optionally supported. It is to be noted that a minute LOPv/PAISv detection condition is supposed to be the same as the detection condition of the conventional LOPc/PAISc.

The specific operation of the pointer processor according to the present invention will now be described.

The receiving side processor 30 operates in synchronization with a receiving side clock (R) 721 and a frame timing (R) signal 722, and the transmitting side processor 40 operates in synchronization with a transmitting side clock (S) 731 and a frame timing (S) signal 732.

At the receiving side processor 30, the SPE offset counter (R) 35 generates an SPE timing (R) signal 723 indicating an SPE position (SPE position of the high-speed frame) of the receiving data (R) 711 with reference to the frame timing (R) signal 722 to be outputted to the SPE timing (R) portion 36.

Also, the SPE offset counter (R) 35 generates a $1/783$ counter value 720 indicating an offset position of the SPE with reference to the frame timing (R) signal 722 to be provided to each J1 counter 34.

Each pointer detector 32 respectively detects the H1/H2 bytes of the STS-1 channel corresponding to its own detector from the receiving data (R) 711 with reference to the frame timing (R) signal 722, interprets the H1/H2 bytes based on the definition shown in the items (11)-(18) in FIG. 7B, and detects an active pointer value, an INC/DEC indication, an AIS indication, an LOP indication, the conventional concatenation indication, or the like for each channel.

Furthermore, each pointer detector 32 respectively retrieves the linear list according to the present invention and the virtual concatenation based on the list. The retrieval function is added to the conventional pointer detector.

The pointer detector 32 updates the active pointer portion 33 by the detected active pointer. When detecting positive/negative stuff, the pointer detector 32 provides INC/DEC (R) information 718 to the SPE timing (R) portion 36. When detecting the AIS or the LOP, the pointer detector 32 provides LOP/PAIS (PAIS INS) information 716 to the pointer inserter 41. When detecting the conventional concatenation indication and the virtual concatenation of the present invention, the pointer detector 32 provides CONC/Virt. CONC information 717 to the selectors (R) 38 and 48, and the pointer generator 44.

The J1 counters 34 respectively generate J1 enable (R) signals 714_1-714_n indicating J1 positions (path traces) of the STS-1 channels CH1-CHn from the active pointers P(R) 1-P(R)N with reference to the counter value 720.

The generation of a write address (R) 726 to the ES memory 31 of each STS-1 channel CH will now be described.

The SPE timing (R) portion 36 generates a timing signal 724 of the ES memory 31 considering the byte subsequent to the H3 byte upon reception of the INC (R) information, and the H3 byte upon reception of the DEC (R) information, based on the SPE timing (R) signal 723 indicating the SPE position of the receiving data (R) 711 and the INC/DEC (R) information 718 from the pointer detector 32.

The write counter 37 at the subsequent stage performs a $1/17$ frequency division to the timing signal 724 and generates a write address (R) 725 to the ES memory 31. However, the address (R) generated at the write counter 37 does not consider the conventional concatenation and the virtual concatenation according to the present invention, so that an independent write address is generated for each channel CH.

In order to make the write address of the slave channel composing the virtual concatenation coincide with the write address of the head channel, the selector (R) 38 selects the write address of the head channel as the write address of the slave channel based on the CONC/Virt. CONC information 717.

The function of the selector (R) 38 selecting the write address of the head channel as the write address of the slave channel based on the Virt. CONC information (linear list) within the CONC/Virt. CONC information 717 is a function added for the virtual concatenation processing of the present invention. The arrangement and the operation of the selector (R) 38 will be more specifically described later referring to FIG. 10.

Generation of a read address (S) 736 of the STS-1 channel CH from each ES memory 31 in the transmitting side processor will now be described.

The SPE offset counter (S) 45 generates a counter value 730 indicating the offset position of the SPE with reference to a transmitting side frame timing (S) signal 732 to be provided to the offset generator 43. Furthermore, the SPE offset counter (S) 45 generates an SPE timing (S) signal 733 indicating the SPE position of the transmitting data (S) 713 to be outputted to the SPE timing (S) portion 46.

The SPE timing (S) portion 46 generates a timing signal 734 to the ES memory 31 considering a phase variation between the receiving side clock (R) 721 and the transmitting side clock (S) 731, i.e. a data addition (positive stuffing) in the H3 byte upon INC(S) transmission and a data non-addition (negative stuffing) in the byte subsequent to the H3 byte upon DEC(S) transmission, based on an INC/DEC request 719 from the phase comparator 49 and the SPE timing (S) signal 733.

The read counter 47 at the subsequent stage performs a $1/17$ frequency division to the timing signal 734 and generates an address (S) 735. However, the address (S) 735 does not consider the conventional concatenation and the virtual concatenation according to the present invention, so that it is an independent read address for each channel.

In order to make the read address of the slave channel coincide with the read address of the head channel, with respect to the concatenation signal, the selector (S) 48 at the subsequent stage selects the read address of the head channel for the slave channel based on the CONC/Virt. CONC information 717.

The operation of the selector (S) 48 based on the Virt. CONC information within the CONC/Virt. CONC information 717 is a function added for the virtual concatenation processing of the present invention. This function is basically the same as that of the above-mentioned selector (R) 38, and will be more specifically described later referring to FIG. 10.

The above-mentioned INC/DEC request 719 is generated by the phase comparator 49. The phase comparator 49 detects that the write address and the read address, which usually hold a fixed interval, become close, based on a phase difference between a write timing signal 727 from the write counter 37 and a read timing signal 737 from the read counter 47, and transmits the INC/DEC request 719 requesting the positive/negative stuffing for restoring a normal interval.

By this positive/negative stuffing, the phase variation between the receiving side clock and the transmitting side clock is absorbed, and the change of the STS-1 channels CH1-CHn from the receiving side frame to the transmitting side frame is normally performed.

Data 712 and a J1 enable (S) signal 715, to which a frame change processing is performed in the same way as the data 712 are read from the ES memory 31 with the read address (S) 736.

Each NDF generator 42 compares the position of the J1 enable (S) signal 715 of the present frame with the J1 enable (S) signal 715 of the previous frame, and generates an NDF enable signal 739 when the position changes, to be provided to the pointer generator.

Also, each offset generator 43 calculates an offset of an occurrence position of the J1 enable (S) signal with reference to the counter value 730 of the SPE offset counter (S) 45, and generates a 10-bit pointer value 738 corresponding to each channel.

Each pointer generator 44 generates a transmitting side H1/H2 byte 740 based on the NDF enable signal 739, the 10-bit pointer value 738, the INC/DEC (S) request 719, and the CONC/Virt. CONC information 717, to be provided to the pointer inserter 41.

This transmitting side H1/H2 byte 740 includes not only normal concatenation setting information but also virtual concatenation setting information (linear list information) of the present invention, generated based on the Virt. CONC information within the CONC/Virt. CONC information 717. Namely, a function for including the virtual concatenation setting information of the present invention in the H1/H2 bytes is added to the pointer generator 44.

The pointer inserter 41 outputs data (S) 713 in which the transmitting side H1/H2 byte 740 is added in the main signal data 712 after the change processing.

Thus, by absorbing the phase difference variation of the write/read timing of the overhead in the high-speed frame in the ES memory 31, the pointer processor is supposed to perform the change of the low-speed frame from the receiving side high-speed frame to the transmitting side high-speed frame.

Also, specifically as for the slave low-speed frames composing the virtual concatenation, the change to the transmitting side high-speed frame is performed with the same phase as the head low-speed frame.

Figures 10A, 10B:
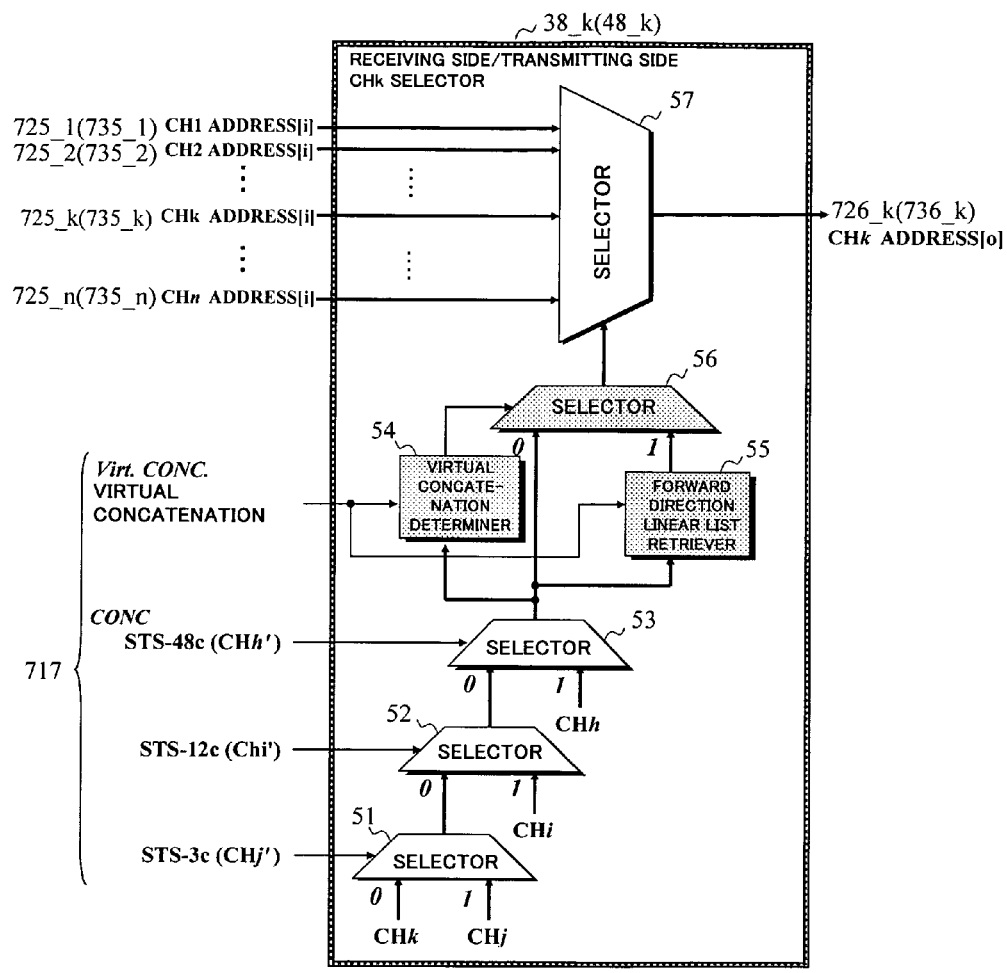
FIGS. 10A and 10B are block diagrams showing an embodiment of a channel CHk selector on a transmitting side and a receiving side in a pointer processor of a virtual concatenation transmission device according to the present invention.

FIG. 10A shows an embodiment of a receiving side selector (R) 38_$k$ and a transmitting side selector (S) 48_$k$ of a channel CHk shown in FIG. 9. The selector (R) 38_$k$ and the selector (S) 48_$k$ can support the conventional concatenation STS-48c. Since the arrangements and the operations of both selectors are the same, only the operation for the receiving side selector (R) 38_$k$ will now be described.

Generally, the receiving side selector (R) 38 and the transmitting side selector (S) 48 of the channel CHk respectively select the write/read address of the head channel as the write/read address of the slave channel based on the concatenation setting information of the STS-1, STS-3c, STS-12c, and STS-48c. Furthermore, the receiving side selector (R) 38_$k$ and the transmitting side selector (S) 48_$k$ according to the present invention select the write/read address of the head channel when the channel CHk is the virtual slave channel of the virtual concatenation.

The selector (R) 38_$k$ selects, based on the CONC/Virt. CONC information 717, one of the addresses (R) 725_1-725_$n$ from the write counters 37_1-37_$n$ to be outputted as the write address (R) 726_$k$ of the channel CHk.

FIG. 10B shows a logic determining a channel No. (head channel for concatenation) for selecting the write address. In "setting", "concatenation classification (non-concatenation (STS-1), concatenation STS-3c; STS-12c, STS-48c, and virtual concatenation)" notified by the CONC/Virt. CONC information 717 is indicated. In "selection timing", it is indicated that the channel Nos. designating each selection timing (address) corresponding to "concatenation classification" are respectively channels CHk, CHj, Chi, CHh, and the head channel CH as the result of the retrieval in a forward direction list.

The channels CHk, CHj, Chi, CHh are different for every receiving side selector (R) 38_$k$. When the receiving side selector (R) 38_$k$ is e.g. a receiving side selector (R) 38_33 of the channel 33, the channels CHk, CHj, Chi, and CHh are respectively set to the channels CH33, CH31, CH25, and CH1 which are the head channels of the STS-1, STS-3c, STS-12c, and STS-48c including the channel 33.

In the selector (R) 38_$k$, the selectors 51-53 respectively select, based on the CONC/Virt. CONC information 717 (the conventional concatenation information and linear list information of the present invention), the "1" side input, in case of concatenations STS-3CHj', STS-12cCHi', STS-48cCHh', and otherwise select the "0" side input to be outputted.

If the virtual concatenation is detected, the virtual concatenation determiner 54 selects the "1" side input of the selector 56, and if not the case the virtual concatenation determiner 54 outputs the "0" side input. A forward direction linear list retriever 55 retrieves the linear list of the virtual concatenation in the forward direction based on the Virt. CONC information within the CONC/Virt. CONC information 717.

Accordingly, when neither of the conventional concatenation nor the virtual concatenation of the present invention is set in the selector (R) 38_33, for example, the selectors 51-56 all select the "0" side input, whereby the channel CHk is selected and the selector 57 selects an address 725_33 of the designated channel CHk.

Also, when the virtual concatenation is not set and the channel CH33 is a slave channel of the conventional STS-3c concatenation, the selector (R) 38_33 selects the write address 726_31 of the head channel CH31 of this concatenation in the same way as the prior art. The above two examples are the same as the conventional selector (R).

Also, when the virtual concatenation shown in FIG. 4 is set and the channel CH33 is the slave channel of the conventional STS-3c concatenation, the selector (R) 38_33 selects the write address 726_50 of the head channel CH50 of the virtual concatenation.

In the selection processing of the receiving side selector (R) 38, as described in the pointer processor of FIG. 8, the positive/negative stuff processing is performed based on the INC(R)/DEC(R) detection in the pointer byte of the head channel, and the positive/negative stuff processing of the virtual slave channel in synchronization with the head channel is realized.

Similarly, in the transmitting side selector (S) 48, based on the CONC/Virt. CONC information 717, the read address (S) 736 of the slave channel is determined in synchronization with the address of the head channel, and positive/negative stuff processing of the virtual slave channel is realized.

[2] TSA Portion

FIG. 11 shows an embodiment of the TSA portion 14 according to the present invention. In this embodiment, linear list converters 61_1, 61_2, 62_1, 62_2, 63_1, and 63_2 for performing processing of replacing the channel CH Nos. before a TSA portion 14a with the channel CH Nos. after the TSA portion 14a based on a TSA setting command 741 are added to each output side of the conventional TSA portion 14a.

For example, in the TSA portion 14 for performing cross-connect processing within the SONET/SDH optical network, a channel CH change is performed. Therefore, replacing processing of the linear list converter is a necessary function for transmitting the virtual concatenation of the present invention.

FIGS. 12A-12C show an example of replacing processing of the linear list converter. FIG. 12A shows the virtual concatenation (STS-1 channel CH2←STS-1 channel CH12←STS-3c channel CH3) before being inputted to the TSA portion 14.

This linear list replacing processing is performed by e.g. the TSA setting command 741: "ENT-CRS-STS5V::LS1-CH2&LS1-CH12& LS1-3c-CH3,HS1-CH50&HS1-CH15&HS1-3c-CH11:CTAG;" for setting a cross-connection of the virtual concatenation.

This command 741 means the linear list replacement of "Low-speed LS1-CH2→high-speed HS1-CH50, low-speed LS1-CH12→high-speed HS1-CH15, and low-speed LS1-3c-CH3→high-speed HS1-3c-CH11". It is to be noted that since the channel CH50 is a head channel, the linear list replacement does not occur in it.

FIG. 12B shows the virtual concatenation (STS-1 channel CH50, STS-1 channel CH15, and STS-3c channel CH11) cross-connected at the TSA portion 14. The linear list of the virtual concatenation is one before being inputted to the TSA portion 14, in which the STS-1 channel CH50, the STS-1 channel CH15, and the STS-3c channel CH11 are not concatenated or linked.

Therefore, the linear list converter performs the linear list replacement as shown in FIG. 12C, whereby the linear list corresponding to the virtual concatenation (STS-1 channel CH50←STS-1 channel CH15←STS-3c channel CH11) is generated.

It is to be noted that when a through station of the BLSR is included and the "through" mode is set at the TSA portion 14, the linear list replacing processing can be omitted.

[3] Ring Bridge and Ring Switch

In an OC-N 2F-BLSR ring network of 2-fiber system, there are a single fiber for clockwise transmission and a single fiber for counterclockwise transmission. N/2 channels in the STS-N frame within a single fiber are working channels and the remaining N/2 channels are protection channels of the other fiber. In case of OC-192, for example, channels CH1-CH96 within the STS-192 frame of the fiber for clockwise transmission are the working channels while the channels CH97-CH192 of the fiber for counterclockwise transmission are protection channels for the working channels.

In the optical transmission device 100 of FIG. 8, for example, when a fault occurs on the transmission OC-N on the west side, the ring bridge 16_2 receives the data of the working channels CH1-CH96 inputted from the OC-N on the east side through the OH drop portion 11_1, the ring switch 12_1, the pointer processor 13_1, the TSA portion 14, and the service selector 15_1, and loops back the data by the protection channels CH98-CH192 of the OC-N on the east side. At this time, the ring bridge 16_2 is required to perform the linear list replacement.

On the other hand, due to the fault occurrence in the OC-N frame on the east side, the optical transmission device 100 having received the data by the working channels CH1-CH96 from the above-mentioned optical transmission device 100 receives the data of the protection channels CH97-CH192 looped back, as mentioned above, from the OC-N frame on the west side.

In the optical transmission device 100 having received the data, the ring switch 12_1 receives the data of the protection channels CH98-CH192 through the OH drop portion 11_2, and transmits the data by the working channels CH1-CH96. At this time, the ring switch 12_2 is required to perform the linear list replacement.

It is to be noted that since the working fibers are switched over to the protection fibers upon fault occurrence all at once, and the channel No. is not changed in an OC-N 4F-BLSR ring network of 4-fiber system, the linear list replacement is not required.

[3-1] Ring Bridge

FIG. 13 shows an embodiment of the ring bridge 16 according to the present invention. In this ring bridge 16, a linear list converter 68a (hatched portion) is added to the output side of the conventional ring bridge composed of the selectors 65a, 66a, and 67a. In the 2F-BLSR ring network, a 2F/4F setting signal 745 is set to "2F setting".

When a fault occurs on one fiber, a ring bridge control signal 743 (see 743_1 and 743_2 of FIG. 8) indicates "protection". In the selectors 66a and 67a of the ring bridge 16, the working channels CH1-CH96 are switched over to the protection channels CH97-CH192, but the linear list still corresponds to the working channels CH1-CH96. Therefore, the linear list converter 68a replaces the linear list corresponding to the working channel No. with the linear list corresponding to the protection channel No.

FIGS. 14A-14C show an example of a replacement operation of the linear list by the linear list converter 68a shown in FIG. 13. FIG. 14A shows the virtual concatenation (STS-1 channel CH50←STS-1 channel CH15←STS-3c channel CH11 (head CH channel: STS-1 channel CH31) of the working channel inputted to the linear list converter 68a.

FIG. 14B shows the virtual concatenation (STS-1 channel CH146, STS-1 channel CH111, STS-3c channel CH43 (head channel: STS-1 channel CH127)) of the protection channel inputted to the linear list converter 68a, and the STS-1 channel CH146, the STS-1 channel CH111, and the STS-3c channel CH43 are not concatenated by the linear list.

Therefore, the linear list converter 68a performs a replacement of the linear list as shown in FIG. 14C, and sets the linear list of the virtual concatenation (STS-1 channel CH146←STS-1 channel CH111←STS-3c channel CH43).

Namely, the linear list converter 68a realizes the replacement of the linear list corresponding to the protection channels (CH111 and CH146) only by adding "96 (=N/2 (in case of N=192))" to the channel Nos. (CH15 and CH50) of the previous linear list.

[3-2] Ring Switch

FIG. 15 shows an embodiment of the ring switch 12 according to the present invention. The arrangement of this ring switch is the same as that of the ring bridge 16 shown in FIG. 13. A linear list converter 68b (hatched portion) is added to the output side of the conventional ring switch composed of selectors 65b, 66b, and 67b.

In the 2F-BLSR ring network, the 2F/4F setting signal 744 is set to "2F setting". When a fault occurs on one fiber, a ring switch control signal 742 (see signals 742_1 and 742_2 of FIG. 8) indicates "protection". The selectors 66b and 67b of the ring switch 12 switch back the data transmitted from the protection channels CH97-CH192 to the working channels CH1-CH96. At this time, the linear lists of the working channels CH1-CH96 outputted from the selector 67b are the linear lists corresponding to the protection channels CH97-CH192.

Therefore, the linear list converter 68*b* replaces the linear list corresponding to the protection channel No. with the linear list corresponding to the working channel No.

FIGS. 16A-16C show examples of the replacement operation of the linear list by the linear list converter 68*b* shown in FIG. 15. FIG. 16A shows the virtual concatenation (STS-1 channel CH146←STS-1 channel CH111←STS-3c channel CH43 (head channel: STS-1 channel CH127)) of the protection channel.

FIG. 16B shows the virtual concatenation (STS-1 channel CH50, STS-1 channel CH15, STS-3c channel CH11 (head channel: STS-1 channel CH31)) of the working channel before the input to the linear list converter 68*b*. The STS-1 channel CH50, the STS-1 channel CH15, and the STS-3c channel CH11 are not concatenated.

The linear list converter 68*b* performs the replacement of the linear list as shown in FIG. 16C, and sets the linear list of the virtual concatenation (STS-1 channel CH50←STS-1 channel CH15←STS-3c channel CH11).

It is to be noted that the linear list converter 68*b* can replace the protection channel No. of the previous linear list with the linear list corresponding to the working channel No. only by subtracting N/2="96 (in case of N=192)".

[4] Path Switch

Figure 17:
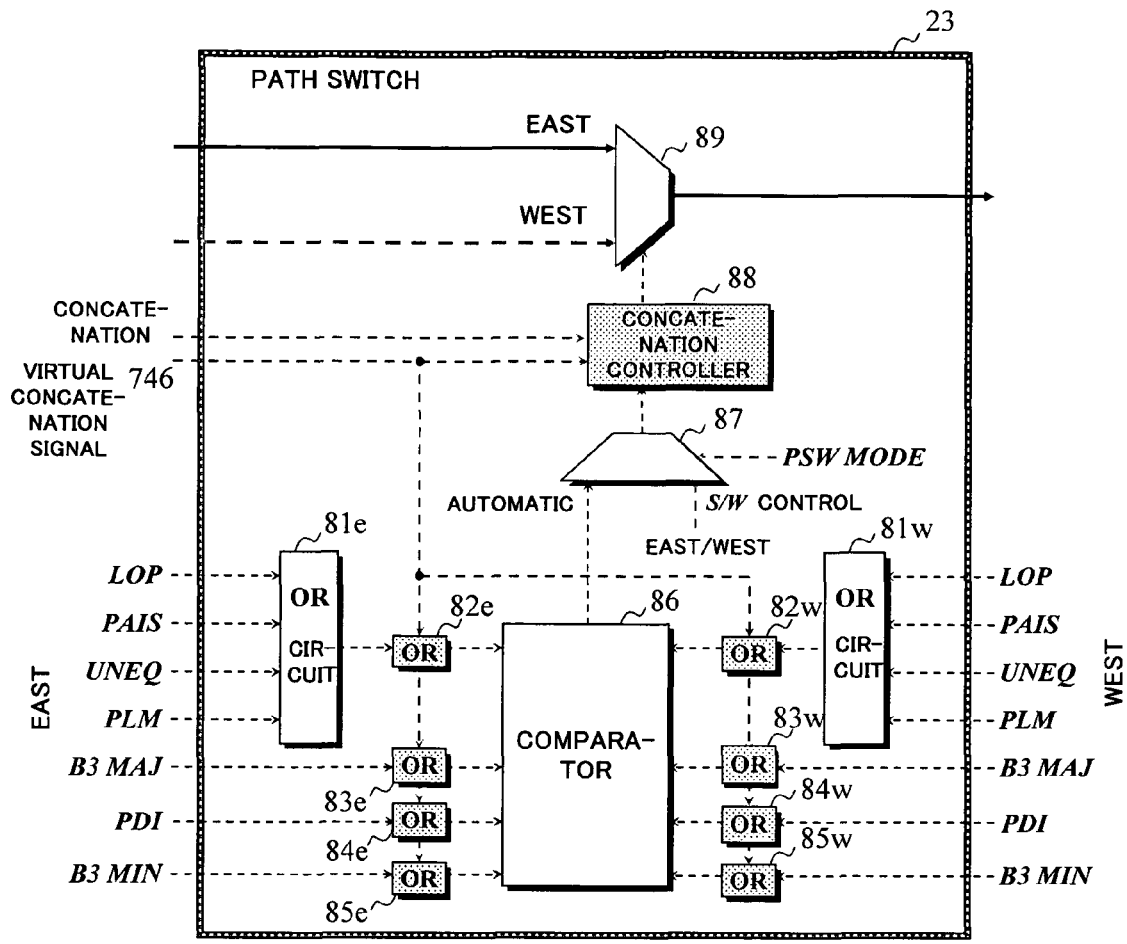
FIG. 17 is a block diagram showing an embodiment of a path switch in a virtual concatenation transmission device according to the present invention.

FIG. 17 shows an embodiment of the path switch 23 according to the present invention. This path switch 23 selects the channel data from the east side or the west side by channel to be outputted (see FIG. 8). General operation example of the path switch will now be described.

In the UPSR ring network, the optical transmission device 100 on the transmitting side transmits the same data as the data transmitted to the working channel on e.g. the east side to the protection channel on the west side. In the optical transmission device 100 on the receiving side, the path switch 23 receives the same data from the working channel on the west side and the protection channel on the east side. However, the path switch 23 generally receives the data from the working channel.

When a fault occurs on the working channel on the west side, the path switch 23 switches the reception from the working channel to the protection channel.

Also, the conventional path switch controls a channel selector to receive the conventional concatenation (head channel and its slave channels) by the concatenation in the same direction (east/west).

In the path switch 23 of the present invention, OR circuits 82*e*-85*e*, and OR circuits 82*w*-85*w* (hatched circuit) are further added to the conventional path switch composed of a selector 89, a concatenation controller 88 (hatched block), a selector 87, OR circuits 81*e* and 81*w*, and the comparator 86 as shown in FIG. 17.

Among them, the concatenation controller 88 has a function of selecting the conventional concatenation from the channel of the same direction (west/east) based on the concatenation signal within a concatenation/virtual concatenation signal 746. In addition to this conventional selecting function, the concatenation controller 88 controls the selector 89 to select the slave channels of the virtual concatenation used in the present invention from among the channels of the same direction as the head channel, based on the virtual concatenation signal within the concatenation/virtual concatenation signal 746.

The processing concerning a B3 byte and a C2 byte in case where a path overhead (POH) is added in channels (low-speed frames) composing the virtual concatenation used for the present invention will now be described. It is to be noted that this processing is common to the path switch 23 and the service selector 15 as will be described later.

B3 performance and B3Major/B3Minor are detected for every composing channel. Namely, the B3 byte is added in for every composing channel.

A C2 byte notification and a detection/notification of UNEQ/PLM/PDI are processed for every composing channel. Namely, the C2 byte is added in for every composing channel.

The number of "B3 error" detected for every composing channel is added to be notified as performance by the virtual concatenation.

OR operation is performed to the result of the B3Major/B3Minor detection for every composing channel to be notified as B3MAJv/B3MINv by the virtual concatenation.

OR operation is performed to the result of the UNEQ/PLM/PDI detection for every composing channel to be notified as UNEQv/PLMv/PDIv indication by the virtual concatenation.

Also, an automatic switching of the service selector 15 and the path switch 23 changes to use the result of the OR operation to the indication of all of the channels composing the virtual concatenation such as LOP, PAIS, UNEQ, PLM, B3MAJ, PDI, and B3MIN as determination conditions.

Figure 21:
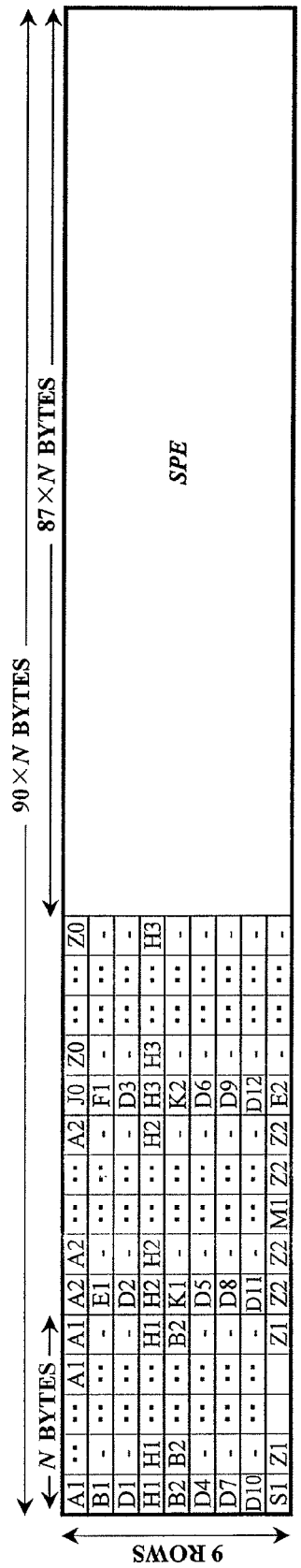
FIG. 21 is a diagram showing an STS-N frame of the conventional SONET/SDH network.
Figure 22:
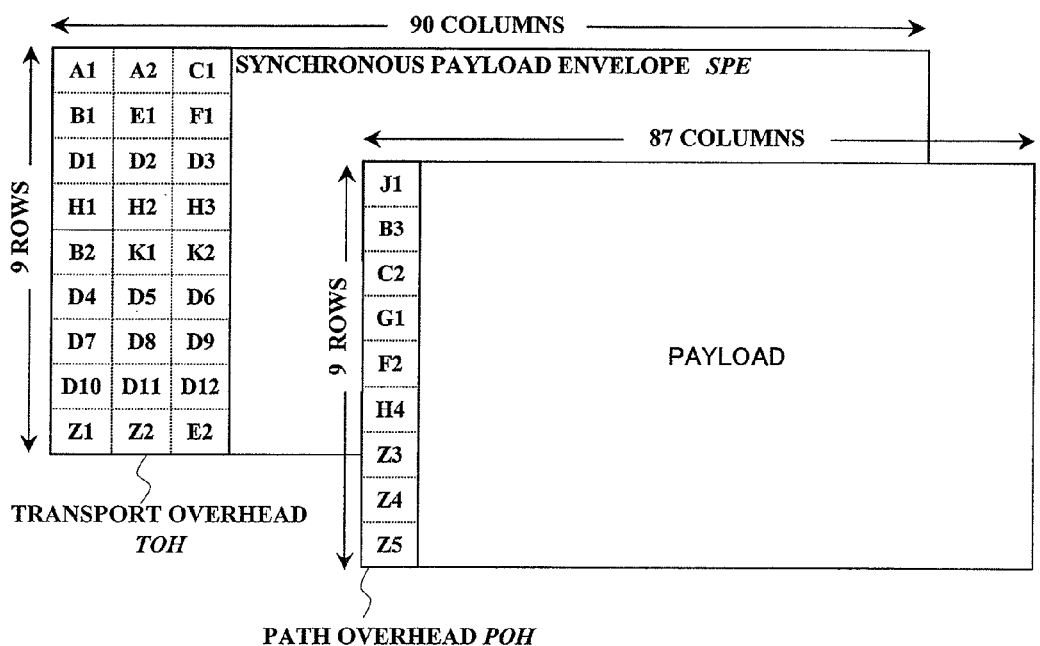
FIG. 22 is a diagram showing an STS-1 frame of the conventional SONET/SDH network and a V3 virtual container example.
Figure 24:
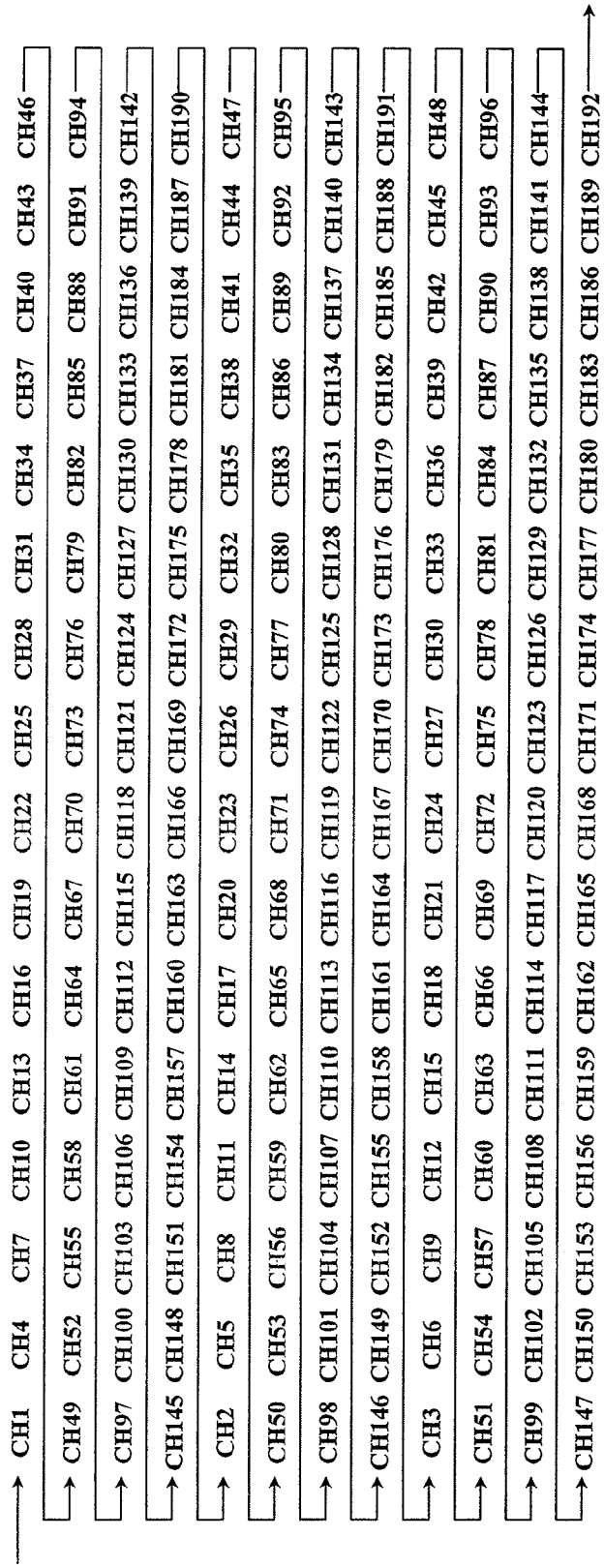
FIG. 24 is a diagram showing an order of 192×STS-1 channel multiplexing in an STS-192 frame of the conventional SONET/SDH network.

These operation is performed at the above-mentioned OR circuits 81*e*, 81*w*, 82*e*-85*e*, 82*w*-85*w*, and the comparator. In case of non-virtual concatenation, the comparator 86 compares, in the same way as the prior art, the result of the OR operation of the LOP, PAIS, UNEQ, and PLM on the east side at the OR circuit 81*e* as well as the B3MAJ, PDI, and B3MIN (see FIG. 21) with the result of the OR operation of the LOP, PAIS, UNEQ, and PLM on the west side at the OR circuit 81*w* as well as the B3MAJ, PDI, and B3MIN, and automatically determines a normal route (east or west).

When a PSW mode is set to "automatic", the selector 87 designates the selector 89 to select a channel from the east or west direction determined by the comparator 86 through concatenation controller 88.

The east/west selection determination of the present invention is different from the conventional determination in that the OR operation result of the LOP, PAIS, UNEQ, and the PLM as well as the B3MAJ, PDI, and B3MIN on the east side and the west side inputted to the comparator 86 are respectively determined by the OR operation result of the LOP, PAIS, UNEQ, and PLM as well as the B3MAJ, the PDI, and the B3MIN of all of the channels composing the virtual concatenation based on the result of the OR operation at the OR circuits 82*e*-85*e*, and the OR circuits 82*w*-85*w*.

Namely, the path switch 23 performs the east/west selection determination based on the result when the OR operation is performed to the determination condition of the LOP, PAIS, UNEQ, PLM, B3MAJ, PDI, and B3MIN of all of the channels composing the virtual concatenation.

Figure 18:
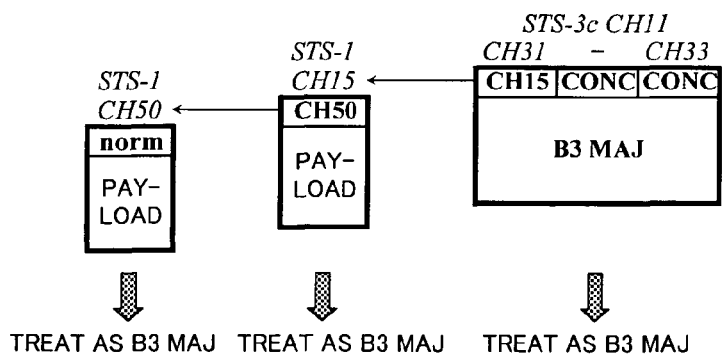
FIG. 18 is a diagram showing an example of processing upon occurrence of an alarm indication (B3MAJ) in a path switch of a virtual concatenation transmission device according to the present invention.

As shown in FIG. 18, when the virtual slave channel CH15 is "B3MAJ", for example, the head channel CH50 and the virtual slave channels CH31-CH33 composing the virtual concatenation which are the same direction (east/west) as the virtual slave channel CH15 are treated as "B3MAJ".

When the PSW mode is set to "switch control", the selector 87 designates the selector 89 to select a channel from the east direction or the west direction designated by the switch in the same way as the prior art.

[5] Service Selector

Figure 19:
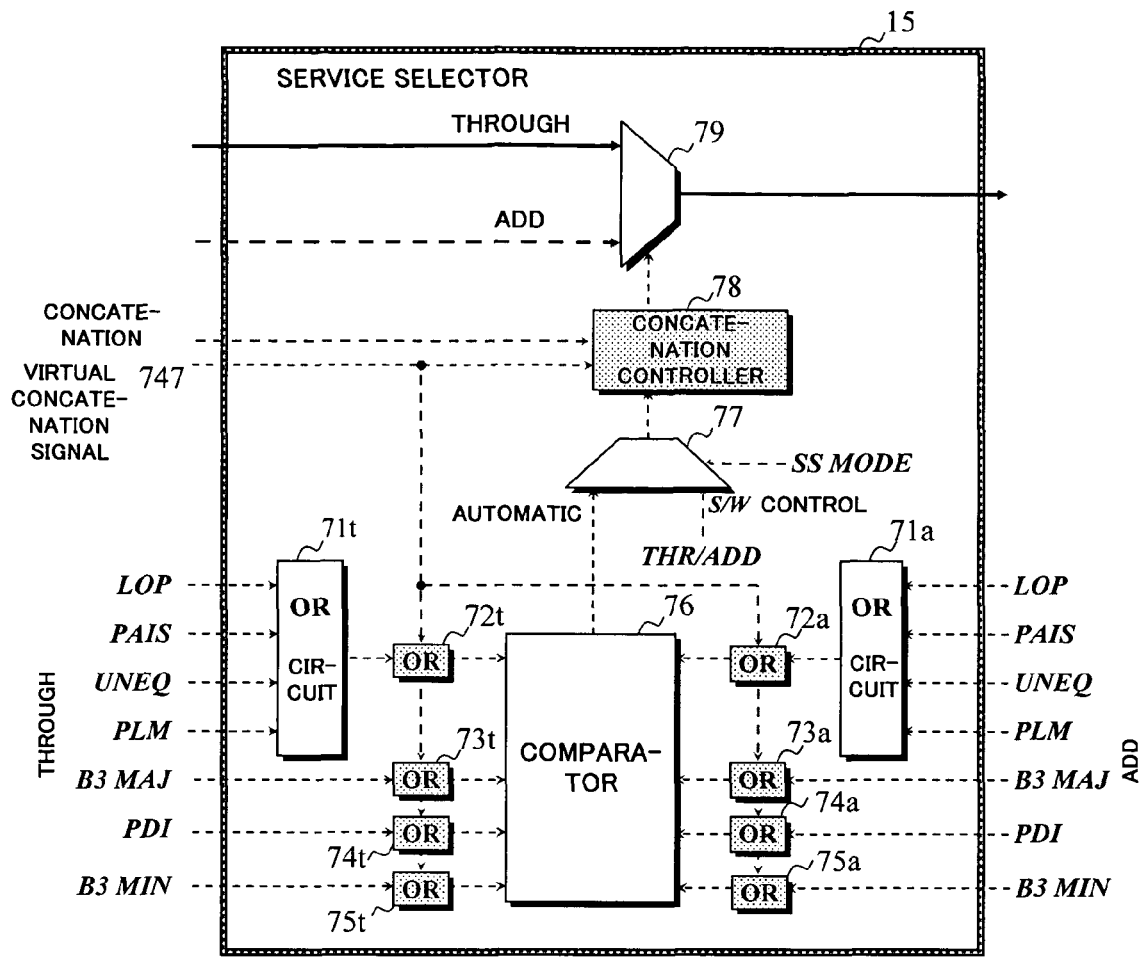
FIG. 19 is a block diagram showing an embodiment of a service selector in a virtual concatenation transmission device according to the present invention.

FIG. 19 shows an embodiment of the selector 15 shown in FIG. 8 according to the present invention. The arrangement of the service selector 15 is the same as that of the path switch 23 shown in FIG. 17 except that channels of "through" and "add" are inputted to a selector 79 and the LOP, PAIS, UNEQ, PLM, B3MAJ, PDI, and B3MIN are alarm signals of the "through" and "add" channels.

As shown in FIG. 8, e.g. the service selector 15_1 has a function of selecting the channel data transmitted from the east side by "through" and the channel data added from the tributary side by the channel.

The service selector 15 of the present invention has not only a function of selecting the slave channels of the conventional concatenation from the same direction ("through/add") as the head channel, but also a function of selecting the virtual slave channels of the virtual concatenation from the same direction ("through/add") as the head channel when a concatenation/virtual concatenation signal 747 indicates the virtual concatenation.

Also, in case of non-virtual concatenation, the service selector 15, in the same way as the path switch 23, automatically determines the normal route ("through" or "add") based on the LOP, PAIS, UNEQ, B3MAJ, PDI, and B3MIN of the "through" and the "add". In case of the virtual concatenation, the service selector 15 automatically determines the normal route ("through" or "add") based on the LOP, PAIS, UNEQ, PLM, B3MAJ, PDI, and B3MIN of the head channel and the slave channels of the "through" and the "add" to which the virtual concatenation is performed.

Namely, the service selector 15 performs the "through/add" selection determination based on the result of the OR operation to the result of the OR operation to the LOP, PAIS, UNEQ, and PLM as well as the determination condition of the B3MAJ, PDI, and B3MIN of all of the channels composing the virtual concatenation.

Figure 20:
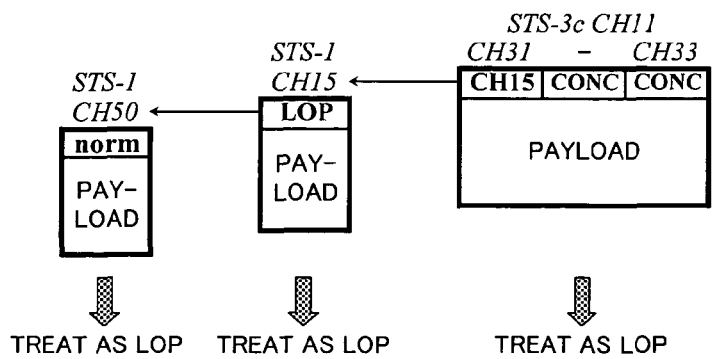
FIG. 20 is a diagram showing an example of processing upon occurrence of an alarm indication (LOP) in a service selector of a virtual concatenation transmission device according to the present invention.

FIG. 20 shows that the channel CH50 and the channels CH31-CH33 composing the virtual concatenation of the same direction ("through/add") as the channel CH15 are treated as "LOP" when e.g. the virtual slave channel CH15 is "LOP".

As described above, a method and a device for virtual concatenation transmission according to the present invention are arranged so that a plurality of low-speed frames are multiplexed into arbitrary positions within a high-speed frame to compose a virtual concatenation, and are transmitted with virtual concatenation information indicating a concatenation state of the positions of the low-speed frames with a phase relationship being maintained. Therefore, it is enough to secure channels for the minimum number of low-speed frames which can accommodate a series of transmission data, thereby wasting no channel. Also, no instantaneous interruption occurs due to a move of data from a channel in which the data are already used to another channel in order to secure consecutive channel positions. Also, since the frames are transmitted with the phase relationship being maintained, no buffer memory for assembling the data on the receiving side is required.

Also, the method and the device for virtual concatenation transmission according to the present invention can easily accommodate to the SONET/SDH network. For example, a scale of a circuit change/addition in a pointer processing circuit is small. Also, it is possible to add the virtual concatenation information to H1/H2 bytes, and it is not necessary to newly secure the area for the virtual concatenation information.

Namely, according to the method and the device for virtual concatenation transmission of the present invention, in the SONET/SDH optical transmission network, a line of an STS-Mc (M=1, 2, ..., N) concatenation which is not limited by the existing concatenation hierarchy can be provided. Thus, the method and the device for virtual concatenation transmission greatly contribute to the construction of the optical transmission network having a high efficiency of line use and a high flexibly by which various multimedia data treated by information service industries which have been developing still rapidly now are flexibly transmitted.

What I claim is:

1. A virtual concatenation transmission method comprising:
    processing pointers so as to keep a phase relationship between a plurality of low-speed frames composing a virtual concatenation always at a same phase with virtual concatenation information at any intervening station or device throughout a network where the frames are transmitted, and
    transmitting the low-speed frames, multiplexed into arbitrary positions within a first high-speed frame and composing the virtual concatenation, together with the virtual concatenation information indicating a concatenation or link state of positions of the low-speed frames, wherein the low-speed frames composing the virtual concatenation are multiplexed from the first high-speed frame into a second high-speed frame, based on the concatenation information, with the concatenation state and the phase relationship being maintained, in which upon the multiplexing of the low-speed frames, positive/negative stuff processings of all of the low-speed frames are always performed at a same time throughout the network in accordance with positive/negative stuff determination of a head low-speed frame.

2. The virtual concatenation transmission method as claimed in claim 1 wherein with reference to a position of a head low-speed frame, the other low-speed frames are multiplexed into positions where the phase relationship is maintained.

3. The virtual concatenation transmission method as claimed in claim 1 wherein position information within the virtual concatenation information is replaced with position information of the low-speed frames multiplexed into a second high-speed frame.

4. The virtual concatenation transmission method as claimed in claim 1 wherein the low-speed frames comprise low-speed frames where a plurality of low-speed frames are concatenated.

5. The virtual concatenation transmission method as claimed in claim 1 wherein the virtual concatenation information is added in an overhead of the high-speed frame.

6. The virtual concatenation transmission method as claimed in claim 5 wherein the virtual concatenation information is added in a pointer of the overhead, which indicates a head position of each low-speed frame, and comprises a linear list which designates a position into which a subsequent low-speed frame concatenated to each low-speed frame is multiplexed, with a value out of a range of offset values set to the pointer.

7. The virtual concatenation transmission method as claimed in claim 6 wherein when any of the pointers corresponding to the low-speed frames composing the virtual concatenation indicates an alarm, the pointers corresponding to the other low-speed frames are made to indicate an alarm.

8. The virtual concatenation transmission method as claimed in claim 6 wherein when the virtual concatenation information indicates a circulating concatenation state, the pointers corresponding to all of the low-speed frames composing the virtual concatenation are made to indicate an alarm.

9. The virtual concatenation transmission method as claimed in claim 1 wherein an alarm indication which has occurred in the low-speed frame composing the virtual concatenation is processed for each low-speed frame or the virtual concatenation.

10. The virtual concatenation transmission method as claimed in claim 1 wherein based on time slot assignment setting information, the positions of the low-speed frames composing the virtual concatenation are converted, and the position information within the virtual concatenation information is replaced.

11. The virtual concatenation transmission method as claimed in claim 1 wherein when any one of the low-speed frames composing the virtual concatenation indicates an alarm, a path is switched over to another path by the virtual concatenation.

12. The virtual concatenation transmission method as claimed in claim 1 wherein upon path switchover, the low-speed frames composing the virtual concatenation are switched over to a path of a same direction as a head low-speed frame by the virtual concatenation.

13. The virtual concatenation transmission method as claimed in claim 1 wherein the high-speed frame and the low-speed frame comprise SONET/SDH frames.

14. The virtual concatenation transmission method as claimed in claim 13 wherein a line is switched by a position replacement of adding N/2 (where N=12, 48, 192, and 768) to the position information within the virtual concatenation information, in a 2F-BLSR ring (2 Fiber Bidirectional Line Switching Ring) network in which the high-speed frame is an STS-N frame.

15. The virtual concatenation transmission method as claimed in claim 13 wherein a line is switched by a position replacement of subtracting N/2 (where N=12, 48, 192, and 768) from the position information within the virtual concatenation information, in a 2F-BLSR ring (2 Fiber Bidirectional Line Switching Ring) network in which the high-speed frame is an STS-N frame.

16. The virtual concatenation transmission method as claimed in claim 1 wherein the virtual concatenation information is set.

17. A virtual concatenation transmission device comprising:
    means for processing pointers so as to keep a phase relationship between a plurality of low-speed frames composing a virtual concatenation always at a same phase with virtual concatenation information at any intervening station or device throughout a network where the frames are transmitted, and
    means for transmitting the low-speed frames, multiplexed into arbitrary positions within a first high-speed frame and composing the virtual concatenation, together with the virtual concatenation information indicating a concatenation or link state of positions of the low-speed frames, wherein the low-speed frames composing the virtual concatenation are multiplexed from the first high-speed frame into a second high-speed frame, based on the concatenation information, with the concatenation state and the phase relationship being maintained, in which upon the multiplexing of the low-speed frames, positive/negative stuff processings of all of the low-speed frames are always performed at a same time throughout the network in accordance with positive/negative stuff determination of a head low-speed frame.

18. The virtual concatenation transmission device as claimed in claim 17 wherein the frame processor multiplexes, with reference to a position of a head low-speed frame, the other low-speed frames into positions where the phase relationship is maintained.

19. The virtual concatenation transmission device as claimed in claim 17, further comprising a virtual concatenation information converter replacing position information within the virtual concatenation information with position information of the low-speed frames multiplexed into a second high-speed frame.

20. The virtual concatenation transmission device as claimed in claim 17 wherein the low-speed frames comprise low-speed frames where a plurality of low-speed frames are concatenated.

21. The virtual concatenation transmission device as claimed in claim 17 wherein the virtual concatenation information is added in an overhead of the high-speed frame.

22. The virtual concatenation transmission device as claimed in claim 21 wherein the virtual concatenation information is added in a pointer of the overhead, which indicates a head position of each low-speed frame, and comprises a linear list which designates a position into which a subsequent low-speed frame concatenated to each low-speed frame is multiplexed, with a value out of a range of offset values set to the pointer.

23. The virtual concatenation transmission device as claimed in claim 22 wherein when any of the pointers corresponding to the low-speed frames composing the virtual concatenation indicates an alarm, the pointers corresponding to the other low-speed frames are made to indicate an alarm.

24. The virtual concatenation transmission device as claimed in claim 22 wherein when the virtual concatenation information indicates a circulating concatenation state, the pointers corresponding to all of the low-speed frames composing the virtual concatenation are made to indicate an alarm.

25. The virtual concatenation transmission device as claimed in claim 17 wherein an alarm indication which has occurred in the low-speed frame composing the virtual concatenation is processed for each low-speed frame or the virtual concatenation.

26. The virtual concatenation transmission device as claimed in claim 17, further comprising a time slot assignment portion converting the positions of the low-speed frames composing the virtual concatenation based on predetermined time slot assignment setting information, and replacing the position information within the virtual concatenation information.

27. The virtual concatenation transmission device as claimed in claim 17, further comprising a path switch switching a path over to another path by the virtual concatenation when any one of the low-speed frames composing the virtual concatenation indicates an alarm.

28. The virtual concatenation transmission device as claimed in claim 17, further comprising a service selector switching a path by the virtual concatenation when any one of the low-speed frames composing the virtual concatenation indicates an alarm.

29. The virtual concatenation transmission device as claimed in claim 17, further comprising a service selector switching the low-speed frames composing the virtual concatenation over to a path of a same direction as a head low-speed frame by the virtual concatenation upon path switchover.

30. The virtual concatenation transmission device as claimed in claim 17, further comprising a path switch switching the low-speed frames composing the virtual concatenation over to a path of a same direction as a head low-speed frame by the virtual concatenation upon path switchover.

31. The virtual concatenation transmission device as claimed in claim 17 wherein the high-speed frame and the low-speed frame comprise SONET/SDH frames.

32. The virtual concatenation transmission device as claimed in claim 31, further comprising a ring bridge switching a line by a position replacement of adding N/2 (where N=12, 48, 192, and 768) to the position information within the virtual concatenation information, in a 2F-BLSR ring (2 Fiber Bidirectional Line Switching Ring) network in which the high-speed frame is an STS-N frame.

33. The virtual concatenation transmission device as claimed in claim 31, further comprising a ring switch switching a line by a position replacement of subtracting N/2 (where N=12, 48, 192, and 768) from the position information within the virtual concatenation information, in a 2F-BLSR ring (2 Fiber Bidirectional Line Switching Ring) network in which the high-speed frame is an STS-N frame.

34. The virtual concatenation transmission device as claimed in claim 17 wherein the virtual concatenation information is set.

* * * * *